United States Patent
Koo et al.

(10) Patent No.: US 11,943,445 B2
(45) Date of Patent: Mar. 26, 2024

(54) IMAGE CODING METHOD AND DEVICE THEREFOR

(71) Applicant: LG Electronics Inc., Seoul (KR)

(72) Inventors: Moonmo Koo, Seoul (KR); Jie Zhao, Seoul (KR); Hyeongmoon Jang, Seoul (KR); Seunghwan Kim, Seoul (KR); Jaehyun Lim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 17/985,507

(22) Filed: Nov. 11, 2022

(65) Prior Publication Data

US 2023/0078305 A1 Mar. 16, 2023

Related U.S. Application Data

(63) Continuation of application No. PCT/KR2021/005877, filed on May 11, 2021.

(Continued)

(51) Int. Cl.
| | | |
|---|---|---|
| H04N 11/02 | (2006.01) | |
| H04N 19/132 | (2014.01) | |
| H04N 19/176 | (2014.01) | |
| H04N 19/18 | (2014.01) | |
| H04N 19/186 | (2014.01) | |
| H04N 19/46 | (2014.01) | |

(52) U.S. Cl.
CPC ......... *H04N 19/132* (2014.11); *H04N 19/176* (2014.11); *H04N 19/18* (2014.11); *H04N 19/186* (2014.11); *H04N 19/46* (2014.11)

(58) Field of Classification Search
CPC .... H04N 19/132; H04N 19/176; H04N 19/18; H04N 19/186; H04N 19/46
USPC .......................................... 375/240.02, 240.18
See application file for complete search history.

(56) References Cited

U.S. PATENT DOCUMENTS

| | | | |
|---|---|---|---|
| 2014/0092983 A1* | 4/2014 | Joshi ...................... | H04N 19/70 375/240.18 |
| 2015/0030067 A1* | 1/2015 | Zhao ...................... | H04N 19/46 375/240.02 |

(Continued)

FOREIGN PATENT DOCUMENTS

| | | |
|---|---|---|
| KR | 20160108618 | 9/2016 |
| KR | 20190057159 | 5/2019 |

(Continued)

OTHER PUBLICATIONS

Bross et al., "Versatile Video Coding (Draft 9)," Joint Video Experts Team (JVET) of ITU-T SG 16 WP 3 and ISO/IEC JTC 1/SC 29/WG 11, Document: JVET-R2001-v8, 18th Meeting: by teleconference, Apr. 15-24, 2020, 524 pages.

*Primary Examiner* — Jayanti K Patel
*Assistant Examiner* — Richard B Carter
(74) *Attorney, Agent, or Firm* — Fish & Richardson P.C.

(57) ABSTRACT

An image decoding method according to the present document may comprise the steps of: receiving image information including residual information and an LFNST index from a bitstream; deriving a transform coefficient on the basis of the residual information; deriving a flag variable related to whether LFNST is applied to a current block on the basis of the LFNST index; and performing the LFNST on the basis of the flag variable and the transform coefficient, wherein the flag variable is derived for each color component of the current block.

6 Claims, 9 Drawing Sheets

Related U.S. Application Data

(60) Provisional application No. 63/035,854, filed on Jun. 8, 2020, provisional application No. 63/025,149, filed on May 14, 2020, provisional application No. 63/023,824, filed on May 12, 2020, provisional application No. 63/022,595, filed on May 11, 2020.

(56) References Cited

U.S. PATENT DOCUMENTS

| | | | |
|---|---|---|---|
| 2020/0389666 A1* | 12/2020 | Zhao | H04N 19/70 |
| 2022/0385946 A1* | 12/2022 | Chiang | H04N 19/157 |

FOREIGN PATENT DOCUMENTS

| | | |
|---|---|---|
| KR | 20190067732 | 6/2019 |
| WO | WO 2013109026 | 7/2013 |

* cited by examiner

IMAGE CODING METHOD AND DEVICE THEREFOR

CROSS-REFERENCE TO RELATED APPLICATIONS

This application is a continuation of International Application No. PCT/KR2021/005877, filed on May 11, 2021, which claims the benefit of U.S. Provisional Application Nos. 63/035,854, filed on Jun. 8, 2020, 63/025,149, filed on May 14, 2020, 63/023,824, filed on May 12, 2020, and 63/022,595, filed on May 11, 2020. The disclosures of the prior applications are incorporated by reference in their entirety.

TECHNICAL FIELD

The present document relates to an image coding technique and, more particularly, to an image coding method based on image transformation in an image coding system and an apparatus therefor.

BACKGROUND

Nowadays, the demand for high-resolution and high-quality images/videos such as 4K, 8K or more ultra high definition (UHD) images/videos has been increasing in various fields. As the image/video data becomes higher resolution and higher quality, the transmitted information amount or bit amount increases as compared to the conventional image data. Therefore, when image data is transmitted using a medium such as a conventional wired/wireless broadband line or image/video data is stored using an existing storage medium, the transmission cost and the storage cost thereof are increased.

Further, nowadays, the interest and demand for immersive media such as virtual reality (VR), artificial reality (AR) content or hologram, or the like is increasing, and broadcasting for images/videos having image features different from those of real images, such as a game image is increasing.

Accordingly, there is a need for a highly efficient image/video compression technique for effectively compressing and transmitting or storing, and reproducing information of high resolution and high quality images/videos having various features as described above.

SUMMARY

A technical aspect of the present disclosure is to provide a method and an apparatus for increasing image coding efficiency.

Another technical aspect of the present document is to provide an efficient image coding method and an image coding apparatus based on an LFNST.

Still another technical aspect of the present document is to provide an image coding method and an image coding apparatus for properly performing an LFNST according to a tree type.

According to an embodiment of the present document, there is provided an image decoding method performed by a decoding apparatus. The method may include: receiving image information comprising residual information and an LFNST index from a bitstream; deriving transform coefficients based on the residual information; deriving a flag variable related to whether an LFNST is applied to a current block based on the LFNST index; and performing the LFNST based on the flag variable and the transform coefficients, wherein the flag variable may be derived for each color component of the current block.

The flag variable may include at least one of a first flag variable for a luma component, a second flag variable for a Cb component, and a third flag variable for a Cr component.

The first flag variable may be set to 1 and the second flag variable and the third flag variable may be set to 0, based on a tree type of the current block being a single tree and a value of the LFNST index being greater than 0.

The first flag variable may be set to 1 based on a tree type of the current block being a dual tree luma and a value of the LFNST index being greater than 0.

The second flag variable and the third flag variable may be set to 1 based on a tree type of the current block being a dual tree chroma and a value of the LFNST index being greater than 0.

The LFNST may be performed on a chroma component of the current block based on a tree type of the current block being a single tree and a color format of the current block being 4:4:4.

According to another embodiment of the present document, there is provided an image encoding method performed by an encoding apparatus. The method may include: deriving prediction samples for a current block; deriving residual samples for the current block based on the prediction samples; deriving a flag variable related to whether an LFNST is applied to the current block; and performing the LFNST based on the flag variable and the residual samples, wherein the flag variable may be derived for each color component of the current block.

According to still another embodiment of the present document, there may be provided a digital storage medium that stores image data including encoded image information and/or a bitstream generated according to an image encoding method performed by an encoding apparatus.

According to yet another embodiment of the present document, there may be provided a digital storage medium that stores image data including encoded image information and/or a bitstream to cause a decoding apparatus to perform the image decoding method.

According to the present document, it is possible to increase overall image/video compression efficiency.

According to the present document, it is possible to increase efficiency of an image coding method and an image coding apparatus based on an LFNST.

According to the present document, it is possible to provide an image coding method and an image coding apparatus for properly performing an LFNST according to a tree type.

The effects that can be obtained through specific examples of the present disclosure are not limited to the effects listed above. For example, there may be various technical effects that a person having ordinary skill in the related art can understand or derive from the present disclosure. Accordingly, specific effects of the present disclosure are not limited to those explicitly described in the present disclosure and may include various effects that can be understood or derived from the technical features of the present disclosure.

DETAILED DESCRIPTION

Figure 1:
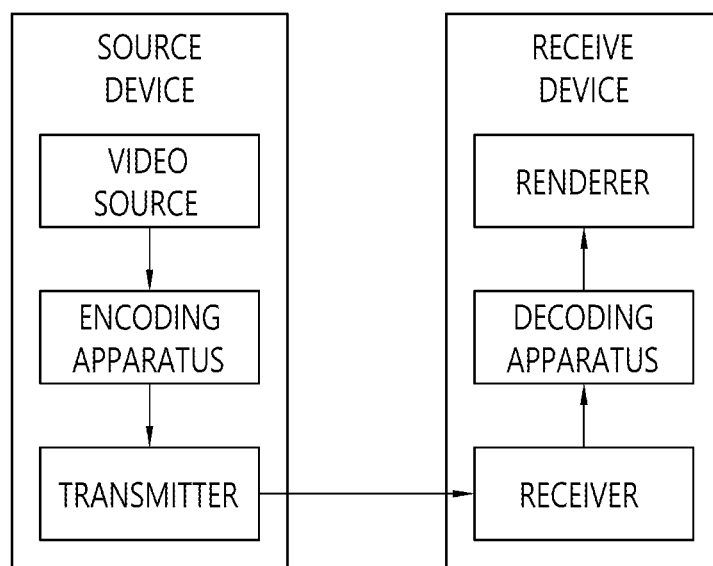
FIG. 1 schematically illustrates an example of a video/image coding system to which the present disclosure is applicable.

While the present disclosure may be susceptible to various modifications and include various embodiments, specific embodiments thereof have been shown in the drawings by way of example and will now be described in detail. However, this is not intended to limit the present disclosure to the specific embodiments disclosed herein. The terminology used herein is for the purpose of describing specific embodiments only, and is not intended to limit technical idea of the present disclosure. The singular forms may include the plural forms unless the context clearly indicates otherwise. The terms such as "include" and "have" are intended to indicate that features, numbers, steps, operations, elements, components, or combinations thereof used in the following description exist, and thus should not be understood as that the possibility of existence or addition of one or more different features, numbers, steps, operations, elements, components, or combinations thereof is excluded in advance.

Meanwhile, each component on the drawings described herein is illustrated independently for convenience of description as to characteristic functions different from each other, and however, it is not meant that each component is realized by a separate hardware or software. For example, any two or more of these components may be combined to form a single component, and any single component may be divided into plural components. The embodiments in which components are combined and/or divided will belong to the scope of the patent right of the present disclosure as long as they do not depart from the essence of the present disclosure.

Hereinafter, preferred embodiments of the present disclosure will be explained in more detail while referring to the attached drawings. In addition, the same reference signs are used for the same components on the drawings, and repeated descriptions for the same components will be omitted.

This document relates to video/image coding. For example, the method/example disclosed in this document may relate to a VVC (Versatile Video Coding) standard (ITU-T Rec. H.266), a next-generation video/image coding standard after VVC, or other video coding related standards (e.g., HEVC (High Efficiency Video Coding) standard (ITU-T Rec. H.265), EVC (essential video coding) standard, AVS2 standard, etc.).

In this document, a variety of embodiments relating to video/image coding may be provided, and, unless specified to the contrary, the embodiments may be combined to each other and be performed.

In this document, a video may mean a set of a series of images over time. Generally a picture means a unit representing an image at a specific time zone, and a slice/tile is a unit constituting a part of the picture. The slice/tile may include one or more coding tree units (CTUs). One picture may be constituted by one or more slices/tiles. One picture may be constituted by one or more tile groups. One tile group may include one or more tiles.

A pixel or a pel may mean a smallest unit constituting one picture (or image). Also, 'sample' may be used as a term corresponding to a pixel. A sample may generally represent a pixel or a value of a pixel, and may represent only a pixel/pixel value of a luma component or only a pixel/pixel value of a chroma component. Alternatively, the sample may refer to a pixel value in the spatial domain, or when this pixel value is converted to the frequency domain, it may refer to a transform coefficient in the frequency domain.

A unit may represent the basic unit of image processing. The unit may include at least one of a specific region and information related to the region. One unit may include one luma block and two chroma (e.g., cb, cr) blocks. The unit and a term such as a block, an area, or the like may be used in place of each other according to circumstances. In a general case, an M×N block may include a set (or an array) of samples (or sample arrays) or transform coefficients consisting of M columns and N rows.

In this document, the term "/" and "," should be interpreted to indicate "and/or." For instance, the expression "A/B" may mean "A and/or B." Further, "A, B" may mean "A and/or B." Further, "A/B/C" may mean "at least one of A, B, and/or C." Also, "A/B/C" may mean "at least one of A, B, and/or C."

Further, in the document, the term "or" should be interpreted to indicate "and/or." For instance, the expression "A or B" may include 1) only A, 2) only B, and/or 3) both A and B. In other words, the term "or" in this document should be interpreted to indicate "additionally or alternatively."

In the present disclosure, "at least one of A and B" may mean "only A", "only B", or "both A and B". In addition, in the present disclosure, the expression "at least one of A or B" or "at least one of A and/or B" may be interpreted as "at least one of A and B".

In addition, in the present disclosure, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present disclosure may mean "for example". Specifically, when indicated as "prediction (intra prediction)", it may mean that "intra prediction" is proposed as an example of "prediction". That is, "prediction" in the present disclosure is not limited to "intra prediction", and "intra prediction" may be proposed as an example of "prediction". In addition, when indicated as "prediction (i.e., intra prediction)", it may also mean that "intra prediction" is proposed as an example of "prediction".

Technical features individually described in one figure in the present disclosure may be individually implemented or may be simultaneously implemented.

FIG. 1 schematically illustrates an example of a video/image coding system to which the present disclosure is applicable.

Referring to FIG. 1, the video/image coding system may include a first device (source device) and a second device (receive device). The source device may deliver encoded video/image information or data in the form of a file or streaming to the receive device via a digital storage medium or network.

The source device may include a video source, an encoding apparatus, and a transmitter. The receive device may include a receiver, a decoding apparatus, and a renderer. The encoding apparatus may be called a video/image encoding apparatus, and the decoding apparatus may be called a video/image decoding apparatus. The transmitter may be included in the encoding apparatus. The receiver may be included in the decoding apparatus. The renderer may include a display, and the display may be configured as a separate device or an external component.

The video source may obtain a video/image through a process of capturing, synthesizing, or generating a video/image. The video source may include a video/image capture device and/or a video/image generating device. The video/image capture device may include, for example, one or more cameras, video/image archives including previously captured video/images, or the like. The video/image generating device may include, for example, a computer, a tablet and a smartphone, and may (electronically) generate a video/image. For example, a virtual video/image may be generated through a computer or the like. In this case, the video/image capturing process may be replaced by a process of generating related data.

The encoding apparatus may encode an input video/image. The encoding apparatus may perform a series of procedures such as prediction, transform, and quantization for compression and coding efficiency. The encoded data (encoded video/image information) may be output in the form of a bitstream.

The transmitter may transmit the encoded video/image information or data output in the form of a bitstream to the receiver of the receive device through a digital storage medium or a network in the form of a file or streaming. The digital storage medium may include various storage mediums such as USB, SD, CD, DVD, Blu-ray, HDD, SSD, and the like. The transmitter may include an element for generating a media file through a predetermined file format, and may include an element for transmission through a broadcast/communication network. The receiver may receive/extract the bitstream and transmit the received/extracted bitstream to the decoding apparatus.

The decoding apparatus may decode a video/image by performing a series of procedures such as dequantization, inverse transform, prediction, and the like corresponding to the operation of the encoding apparatus.

The renderer may render the decoded video/image. The rendered video/image may be displayed through the display.

Figure 2:
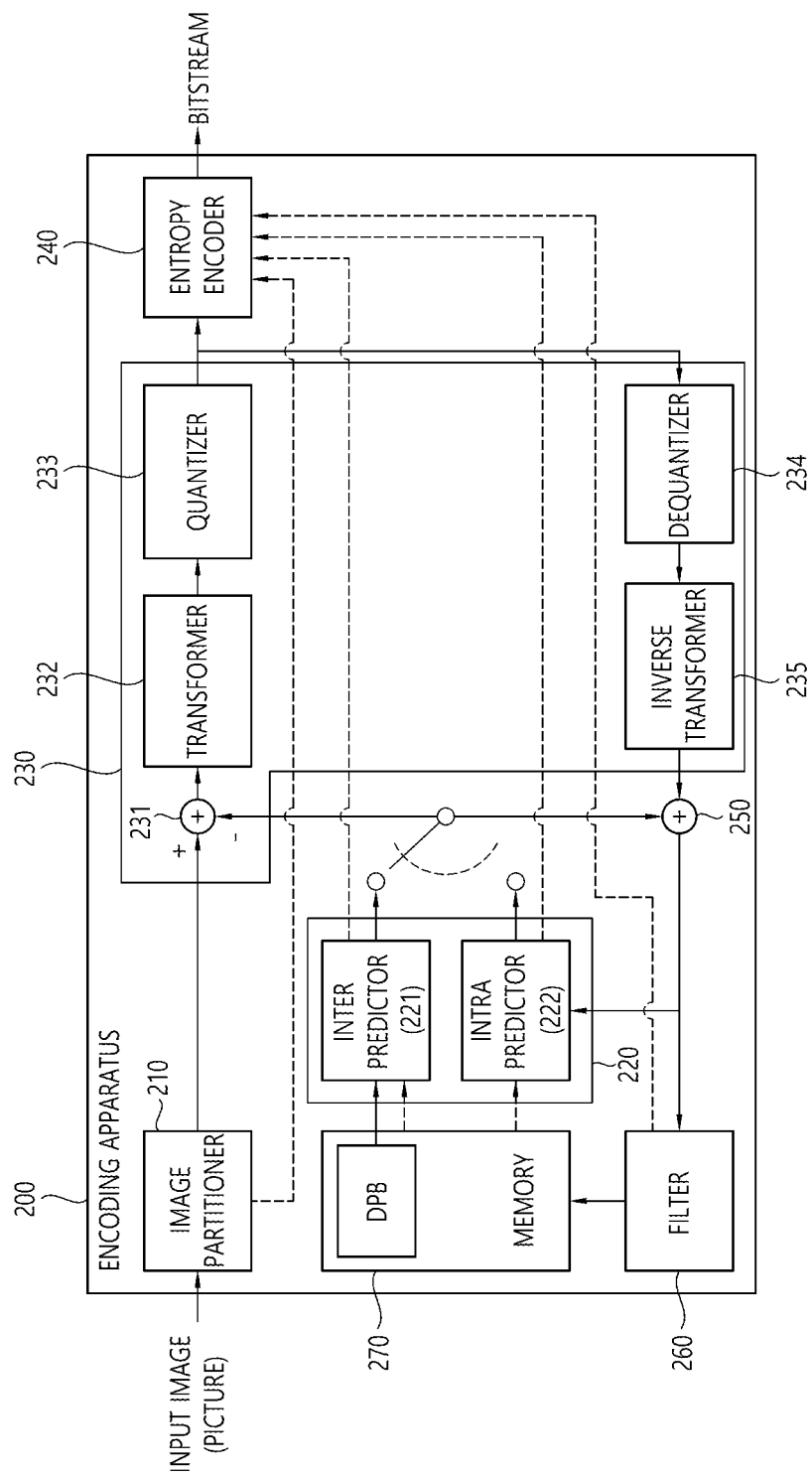
FIG. 2 is a diagram schematically illustrating a configuration of a video/image encoding apparatus to which the present disclosure is applicable.

FIG. 2 is a diagram schematically illustrating a configuration of a video/image encoding apparatus to which the present disclosure is applicable. Hereinafter, what is referred to as the video encoding apparatus may include an image encoding apparatus.

Referring to FIG. 2, the encoding apparatus 200 may include an image partitioner 210, a predictor 220, a residual processor 230, an entropy encoder 240, an adder 250, a filter 260, and a memory 270. The predictor 220 may include an inter predictor 221 and an intra predictor 222. The residual processor 230 may include a transformer 232, a quantizer 233, a dequantizer 234, an inverse transformer 235. The residual processor 230 may further include a subtractor 231. The adder 250 may be called a reconstructor or reconstructed block generator. The image partitioner 210, the predictor 220, the residual processor 230, the entropy encoder 240, the adder 250, and the filter 260, which have been described above, may be constituted by one or more hardware components (e.g., encoder chipsets or processors) according to an embodiment. Further, the memory 270 may include a decoded picture buffer (DPB), and may be constituted by a digital storage medium. The hardware component may further include the memory 270 as an internal/external component.

The image partitioner 210 may partition an input image (or a picture or a frame) input to the encoding apparatus 200 into one or more processing units. As one example, the processing unit may be called a coding unit (CU). In this case, starting with a coding tree unit (CTU) or the largest coding unit (LCU), the coding unit may be recursively partitioned according to the Quad-tree binary-tree ternary-tree (QTBTTT) structure. For example, one coding unit may be divided into a plurality of coding units of a deeper depth based on the quad-tree structure, the binary-tree structure, and/or the ternary structure. In this case, for example, the quad-tree structure may be applied first and the binary-tree structure and/or the ternary structure may be applied later. Alternatively, the binary-tree structure may be applied first. The coding procedure according to the present disclosure may be performed based on the final coding unit which is not further partitioned. In this case, the maximum coding unit may be used directly as a final coding unit based on coding efficiency according to the image characteristic. Alternatively, the coding unit may be recursively partitioned into coding units of a further deeper depth as needed, so that the coding unit of an optimal size may be used as a final coding unit. Here, the coding procedure may include procedures such as prediction, transform, and reconstruction, which will be described later. As another example, the processing unit may further include a prediction unit (PU) or a transform unit (TU). In this case, the prediction unit and the transform unit may be split or partitioned from the above-described final coding unit. The prediction unit may be a unit of sample prediction, and the transform unit may be a unit for deriving a transform coefficient and/or a unit for deriving a residual signal from a transform coefficient.

The unit and a term such as a block, an area, or the like may be used in place of each other according to circumstances. In a general case, an M×N block may represent a set of samples or transform coefficients consisting of M columns and N rows. The sample may generally represent a pixel or a value of a pixel, and may represent only a pixel/pixel value of a luma component, or only a pixel/pixel value of a chroma component. The sample may be used as a term corresponding to a pixel or a pel of one picture (or image).

The subtractor 231 subtracts a prediction signal (predicted block, prediction sample array) output from the inter predictor 221 or the intra predictor 222 from an input image signal (original block, original sample array) to generate a residual signal (residual block, residual sample array), and the generated residual signal is transmitted to the transformer 232. In this case, as shown, a unit which subtracts the prediction signal (predicted block, prediction sample array) from the input image signal (original block, original sample array) in the encoder 200 may be called the subtractor 231. The predictor may perform prediction on a processing target block (hereinafter, referred to as 'current block'), and may generate a predicted block including prediction samples for the current block. The predictor may determine whether intra prediction or inter prediction is applied on a current block or CU basis. As discussed later in the description of each prediction mode, the predictor may generate various information relating to prediction, such as prediction mode information, and transmit the generated information to the entropy encoder 240. The information on the prediction may be encoded in the entropy encoder 240 and output in the form of a bitstream.

The intra predictor 222 may predict the current block by referring to samples in the current picture. The referred samples may be located in the neighbor of or apart from the current block according to the prediction mode. In the intra prediction, prediction modes may include a plurality of non-directional modes and a plurality of directional modes. The non-directional modes may include, for example, a DC mode and a planar mode. The directional mode may include, for example, 33 directional prediction modes or 65 directional prediction modes according to the degree of detail of the prediction direction. However, this is merely an example, and more or less directional prediction modes may be used depending on a setting. The intra predictor 222 may determine the prediction mode applied to the current block by using the prediction mode applied to the neighboring block.

The inter predictor 221 may derive a predicted block for the current block based on a reference block (reference sample array) specified by a motion vector on a reference picture. At this time, in order to reduce the amount of motion information transmitted in the inter prediction mode, the motion information may be predicted on a block, subblock, or sample basis based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block existing in the current picture and a temporal neighboring block existing in the reference picture. The reference picture including the reference block and the reference picture including the temporal neighboring block may be same to each other or different from each other. The temporal neighboring block may be called a collocated reference block, a collocated CU (colCU), and the like, and the reference picture including the temporal neighboring block may be called a collocated picture (colPic). For example, the inter predictor 221 may configure a motion information candidate list based on neighboring blocks and generate information indicating which candidate is used to derive a motion vector and/or a reference picture index of the current block. Inter prediction may be performed based on various prediction modes. For example, in the case of a skip mode and a merge mode, the inter predictor 221 may use motion information of the neighboring block as motion information of the current block. In the skip mode, unlike the merge mode, the residual signal may not be transmitted. In the case of the motion information prediction (motion vector prediction, MVP) mode, the motion vector of the neighboring block may be used as a motion vector predictor and the motion vector of the current block may be indicated by signaling a motion vector difference.

The predictor 220 may generate a prediction signal based on various prediction methods. For example, the predictor may apply intra prediction or inter prediction for prediction on one block, and, as well, may apply intra prediction and inter prediction at the same time. This may be called combined inter and intra prediction (CIIP). Further, the predictor may be based on an intra block copy (IBC) prediction mode, or a palette mode in order to perform prediction on a block. The IBC prediction mode or palette mode may be used for content image/video coding of a game or the like, such as screen content coding (SCC). Although the IBC basically performs prediction in a current block, it can be performed similarly to inter prediction in that it derives a reference block in a current block. That is, the IBC may use at least one of inter prediction techniques described in the present disclosure.

The prediction signal generated through the inter predictor 221 and/or the intra predictor 222 may be used to generate a reconstructed signal or to generate a residual signal. The transformer 232 may generate transform coefficients by applying a transform technique to the residual signal. For example, the transform technique may include at least one of a discrete cosine transform (DCT), a discrete sine transform (DST), a Karhunen-Loève transform (KLT), a graph-based transform (GBT), or a conditionally non-linear transform (CNT). Here, the GBT means transform obtained from a graph when relationship information between pixels is represented by the graph. The CNT refers to transform obtained based on a prediction signal generated using all previously reconstructed pixels. In addition, the transform process may be applied to square pixel blocks having the same size or may be applied to blocks having a variable size rather than the square one.

The quantizer 233 may quantize the transform coefficients and transmit them to the entropy encoder 240, and the entropy encoder 240 may encode the quantized signal (information on the quantized transform coefficients) and output the encoded signal in a bitstream. The information on the quantized transform coefficients may be referred to as residual information. The quantizer 233 may rearrange block type quantized transform coefficients into a one-dimensional vector form based on a coefficient scan order, and generate information on the quantized transform coefficients based on the quantized transform coefficients of the one-dimensional vector form. The entropy encoder 240 may perform various encoding methods such as, for example, exponential Golomb, context-adaptive variable length coding (CAVLC), context-adaptive binary arithmetic coding (CABAC), and the like. The entropy encoder 240 may encode information necessary for video/image reconstruction other than quantized transform coefficients (e.g. values of syntax elements, etc.) together or separately. Encoded information (e.g., encoded video/image information) may be transmitted or stored on a unit basis of a network abstraction layer (NAL) in the form of a bitstream. The video/image information may further include information on various parameter sets such as an adaptation parameter set (APS), a picture parameter set (PPS), a sequence parameter set (SPS), a video parameter set (VPS) or the like. Further, the video/image information may further include general constraint information. In the present disclosure, information and/or syntax elements which are transmitted/signaled to the decoding apparatus from the encoding apparatus may be included in video/image information. The video/image information may be encoded through the above-described encoding procedure and included in the bitstream. The bitstream may be transmitted through a network, or stored in a digital storage medium. Here, the network may include a broadcast network, a communication network and/or the like, and the digital storage medium may include various storage media such as USB, SD, CD, DVD, Blu-ray, HDD, SSD, and the like. A transmitter (not shown) which transmits a signal output from the entropy encoder 240 and/or a storage (not shown) which stores it may be configured as an internal/external element of the encoding apparatus 200, or the transmitter may be included in the entropy encoder 240.

Quantized transform coefficients output from the quantizer 233 may be used to generate a prediction signal. For example, by applying dequantization and inverse transform to quantized transform coefficients through the dequantizer 234 and the inverse transformer 235, the residual signal (residual block or residual samples) may be reconstructed. The adder 155 adds the reconstructed residual signal to a prediction signal output from the inter predictor 221 or the intra predictor 222, so that a reconstructed signal (reconstructed picture, reconstructed block, reconstructed sample array) may be generated. When there is no residual for a processing target block as in a case where the skip mode is applied, the predicted block may be used as a reconstructed block. The adder 250 may be called a reconstructor or a reconstructed block generator. The generated reconstructed signal may be used for intra prediction of a next processing target block in the current block, and as described later, may be used for inter prediction of a next picture through filtering.

Meanwhile, in the picture encoding and/or reconstructing process, luma mapping with chroma scaling (LMCS) may be applied.

The filter 260 may improve subjective/objective video quality by applying the filtering to the reconstructed signal. For example, the filter 260 may generate a modified reconstructed picture by applying various filtering methods to the reconstructed picture, and may store the modified reconstructed picture in the memory 270, specifically in the DPB of the memory 270. The various filtering methods may include, for example, deblocking filtering, sample adaptive offset, an adaptive loop filter, a bilateral filter or the like. As discussed later in the description of each filtering method, the filter 260 may generate various information relating to filtering, and transmit the generated information to the entropy encoder 240. The information on the filtering may be encoded in the entropy encoder 240 and output in the form of a bitstream.

The modified reconstructed picture which has been transmitted to the memory 270 may be used as a reference picture in the inter predictor 221. Through this, the encoding apparatus can avoid prediction mismatch in the encoding apparatus 100 and a decoding apparatus when the inter prediction is applied, and can also improve coding efficiency.

The memory 270 DPB may store the modified reconstructed picture in order to use it as a reference picture in the inter predictor 221. The memory 270 may store motion information of a block in the current picture, from which motion information has been derived (or encoded) and/or motion information of blocks in an already reconstructed picture. The stored motion information may be transmitted to the inter predictor 221 to be utilized as motion information of a neighboring block or motion information of a temporal neighboring block. The memory 270 may store reconstructed samples of reconstructed blocks in the current picture, and transmit them to the intra predictor 222.

Figure 3:
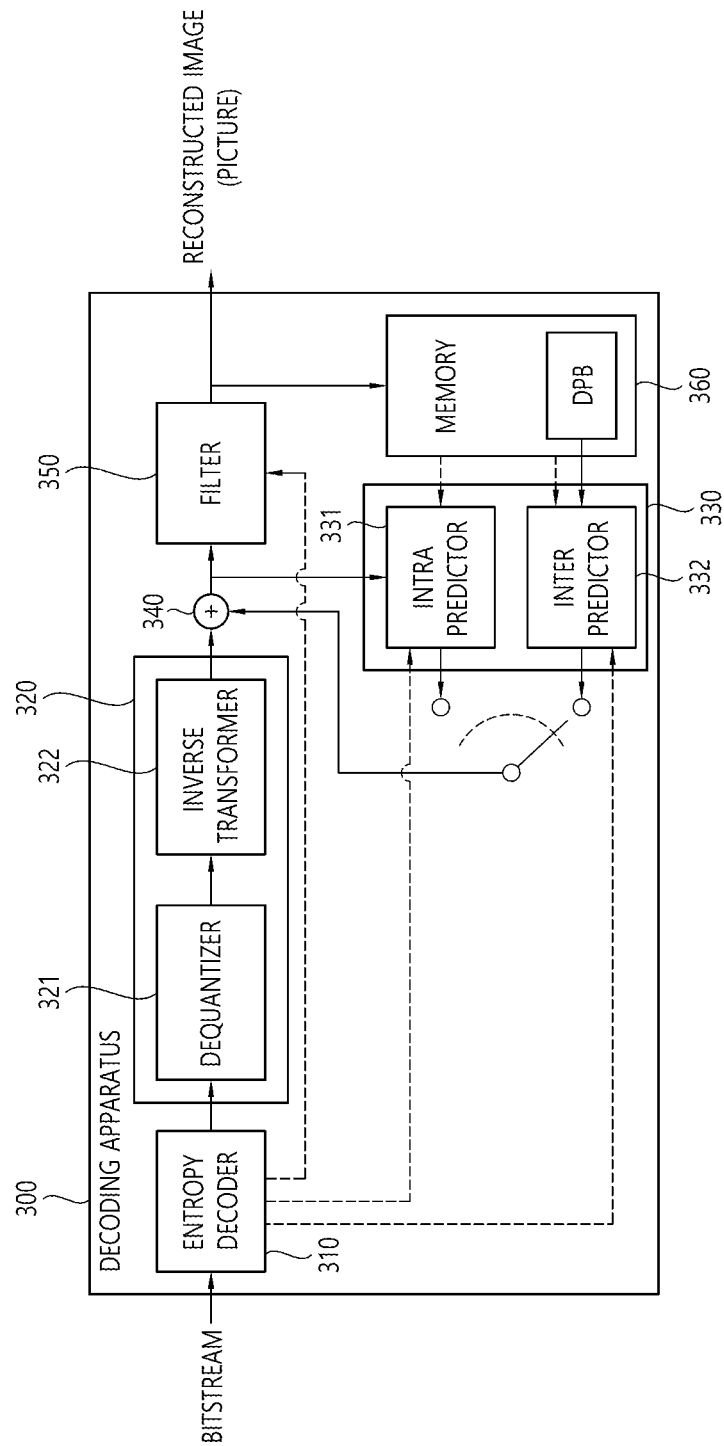
FIG. 3 is a diagram schematically illustrating a configuration of a video/image decoding apparatus to which the present disclosure is applicable.

FIG. 3 is a diagram schematically illustrating a configuration of a video/image decoding apparatus to which the present disclosure is applicable.

Referring to FIG. 3, the video decoding apparatus 300 may include an entropy decoder 310, a residual processor 320, a predictor 330, an adder 340, a filter 350 and a memory 360. The predictor 330 may include an inter predictor 331 and an intra predictor 332. The residual processor 320 may include a dequantizer 321 and an inverse transformer 321. The entropy decoder 310, the residual processor 320, the predictor 330, the adder 340, and the filter 350, which have been described above, may be constituted by one or more hardware components (e.g., decoder chipsets or processors) according to an embodiment. Further, the memory 360 may include a decoded picture buffer (DPB), and may be constituted by a digital storage medium. The hardware component may further include the memory 360 as an internal/external component.

When a bitstream including video/image information is input, the decoding apparatus 300 may reconstruct an image correspondingly to a process by which video/image information has been processed in the encoding apparatus of FIG. 2. For example, the decoding apparatus 300 may derive units/blocks based on information relating to block partition obtained from the bitstream. The decoding apparatus 300 may perform decoding by using a processing unit applied in the encoding apparatus. Therefore, the processing unit of decoding may be, for example, a coding unit, which may be partitioned along the quad-tree structure, the binary-tree structure, and/or the ternary-tree structure from a coding tree unit or a largest coding unit. One or more transform units may be derived from the coding unit. And, the reconstructed image signal decoded and output through the decoding apparatus 300 may be reproduced through a reproducer.

The decoding apparatus 300 may receive a signal output from the encoding apparatus of FIG. 2 in the form of a bitstream, and the received signal may be decoded through the entropy decoder 310. For example, the entropy decoder 310 may parse the bitstream to derive information (e.g., video/image information) required for image reconstruction (or picture reconstruction). The video/image information may further include information on various parameter sets such as an adaptation parameter set (APS), a picture parameter set (PPS), a sequence parameter set (SPS), a video parameter set (VPS) or the like. Further, the video/image information may further include general constraint information. The decoding apparatus may decode a picture further based on information on the parameter set and/or the general constraint information. In the present disclosure, signaled/received information and/or syntax elements, which will be described later, may be decoded through the decoding procedure and be obtained from the bitstream. For example, the entropy decoder 310 may decode information in the bitstream based on a coding method such as exponential Golomb encoding, CAVLC, CABAC, or the like, and may output a value of a syntax element necessary for image reconstruction and quantized values of a transform coefficient regarding a residual. More specifically, a CABAC entropy decoding method may receive a bin corresponding to each syntax element in a bitstream, determine a context model using decoding target syntax element information and decoding information of neighboring and decoding target blocks, or information of symbol/bin decoded in a previous step, predict bin generation probability according to the determined context model and perform arithmetic decoding of the bin to generate a symbol corresponding to each syntax element value. Here, the CABAC entropy decoding method may update the context model using information of a symbol/bin decoded for a context model of the next symbol/bin after determination of the context model. Information on prediction among information decoded in the entropy decoder 310 may be provided to the predictor (inter predictor 332 and intra predictor 331), and residual values, that is, quantized transform coefficients, on which entropy decoding has been performed in the entropy decoder 310, and associated parameter information may be input to the residual processor 320. The residual processor 320 may derive a residual signal (residual block, residual samples, residual sample array). Further, information on filtering among information decoded in the entropy decoder 310 may be provided to the filter 350. Meanwhile, a receiver (not shown) which receives a signal output from the encoding apparatus may further constitute the decoding apparatus 300 as an internal/external element, and the receiver may be a component of the entropy decoder 310. Meanwhile, the decoding apparatus according to the present disclosure may be called a video/image/picture coding apparatus, and the decoding apparatus may be classified into an information decoder (video/image/picture information decoder) and a sample decoder (video/image/picture sample decoder). The information decoder may include the entropy decoder 310, and the sample decoder may include at least one of the dequantizer 321, the inverse transformer 322, the adder 340, the filter 350, the memory 360, the inter predictor 332, and the intra predictor 331.

The dequantizer 321 may output transform coefficients by dequantizing the quantized transform coefficients. The dequantizer 321 may rearrange the quantized transform coefficients in the form of a two-dimensional block. In this case, the rearrangement may perform rearrangement based on an order of coefficient scanning which has been performed in the encoding apparatus. The dequantizer 321 may perform dequantization on the quantized transform coefficients using quantization parameter (e.g., quantization step size information), and obtain transform coefficients.

The dequantizer 322 obtains a residual signal (residual block, residual sample array) by inverse transforming transform coefficients.

The predictor may perform prediction on the current block, and generate a predicted block including prediction samples for the current block. The predictor may determine whether intra prediction or inter prediction is applied to the current block based on the information on prediction output from the entropy decoder 310, and specifically may determine an intra/inter prediction mode.

The predictor may generate a prediction signal based on various prediction methods. For example, the predictor may apply intra prediction or inter prediction for prediction on one block, and, as well, may apply intra prediction and inter prediction at the same time. This may be called combined inter and intra prediction (CIIP). In addition, the predictor may perform intra block copy (IBC) for prediction on a block. The intra block copy may be used for content image/video coding of a game or the like, such as screen content coding (SCC). Although the IBC basically performs prediction in a current block, it can be performed similarly to inter prediction in that it derives a reference block in a current block. That is, the IBC may use at least one of inter prediction techniques described in the present disclosure.

The intra predictor 331 may predict the current block by referring to the samples in the current picture. The referred samples may be located in the neighbor of or apart from the current block according to the prediction mode. In the intra prediction, prediction modes may include a plurality of non-directional modes and a plurality of directional modes. The intra predictor 331 may determine the prediction mode applied to the current block by using the prediction mode applied to the neighboring block.

The inter predictor 332 may derive a predicted block for the current block based on a reference block (reference sample array) specified by a motion vector on a reference picture. At this time, in order to reduce the amount of motion information transmitted in the inter prediction mode, the motion information may be predicted on a block, subblock, or sample basis based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block existing in the current picture and a temporal neighboring block existing in the reference picture. For example, the inter predictor 332 may configure a motion information candidate list based on neighboring blocks, and derive a motion vector and/or a reference picture index of the current block based on received candidate selection information. Inter prediction may be performed based on various prediction modes, and the information on prediction may include information indicating a mode of inter prediction for the current block.

The adder 340 may generate a reconstructed signal (reconstructed picture, reconstructed block, reconstructed sample array) by adding the obtained residual signal to the prediction signal (predicted block, prediction sample array) output from the predictor 330. When there is no residual for a processing target block as in a case where the skip mode is applied, the predicted block may be used as a reconstructed block.

The adder 340 may be called a reconstructor or a reconstructed block generator. The generated reconstructed signal may be used for intra prediction of a next processing target block in the current block, and as described later, may be output through filtering or be used for inter prediction of a next picture.

Meanwhile, in the picture decoding process, luma mapping with chroma scaling (LMCS) may be applied.

The filter 350 may improve subjective/objective video quality by applying the filtering to the reconstructed signal. For example, the filter 350 may generate a modified reconstructed picture by applying various filtering methods to the reconstructed picture, and may transmit the modified reconstructed picture in the memory 360, specifically in the DPB of the memory 360. The various filtering methods may include, for example, deblocking filtering, sample adaptive offset, an adaptive loop filter, a bilateral filter or the like.

The (modified) reconstructed picture which has been stored in the DPB of the memory 360 may be used as a reference picture in the inter predictor 332. The memory 360 may store motion information of a block in the current picture, from which motion information has been derived (or decoded) and/or motion information of blocks in an already reconstructed picture. The stored motion information may be transmitted to the inter predictor 260 to be utilized as motion information of a neighboring block or motion information of a temporal neighboring block. The memory 360 may store reconstructed samples of reconstructed blocks in the current picture, and transmit them to the intra predictor 331.

In this specification, the examples described in the predictor 330, the dequantizer 321, the inverse transformer 322, and the filter 350 of the decoding apparatus 300 may be similarly or correspondingly applied to the predictor 220, the dequantizer 234, the inverse transformer 235, and the filter 260 of the encoding apparatus 200, respectively.

As described above, prediction is performed in order to increase compression efficiency in performing video coding. Through this, a predicted block including prediction samples for a current block, which is a coding target block, may be generated. Here, the predicted block includes prediction samples in a space domain (or pixel domain). The predicted block may be identically derived in the encoding apparatus and the decoding apparatus, and the encoding apparatus may increase image coding efficiency by signaling to the decoding apparatus not original sample value of an original block itself but information on residual (residual information) between the original block and the predicted block. The decoding apparatus may derive a residual block including residual samples based on the residual information, generate a reconstructed block including reconstructed samples by adding the residual block to the predicted block, and generate a reconstructed picture including reconstructed blocks.

The residual information may be generated through transform and quantization procedures. For example, the encoding apparatus may derive a residual block between the original block and the predicted block, derive transform coefficients by performing a transform procedure on residual samples (residual sample array) included in the residual block, and derive quantized transform coefficients by performing a quantization procedure on the transform coefficients, so that it may signal associated residual information to the decoding apparatus (through a bitstream). Here, the residual information may include value information, position information, a transform technique, transform kernel, a quantization parameter or the like of the quantized transform coefficients. The decoding apparatus may perform a quantization/dequantization procedure and derive the residual samples (or residual sample block), based on residual information. The decoding apparatus may generate a reconstructed block based on a predicted block and the residual block. The encoding apparatus may derive a residual block by dequantizing/inverse transforming quantized transform coefficients for reference for inter prediction of a next picture, and may generate a reconstructed picture based on this.

Figure 4:
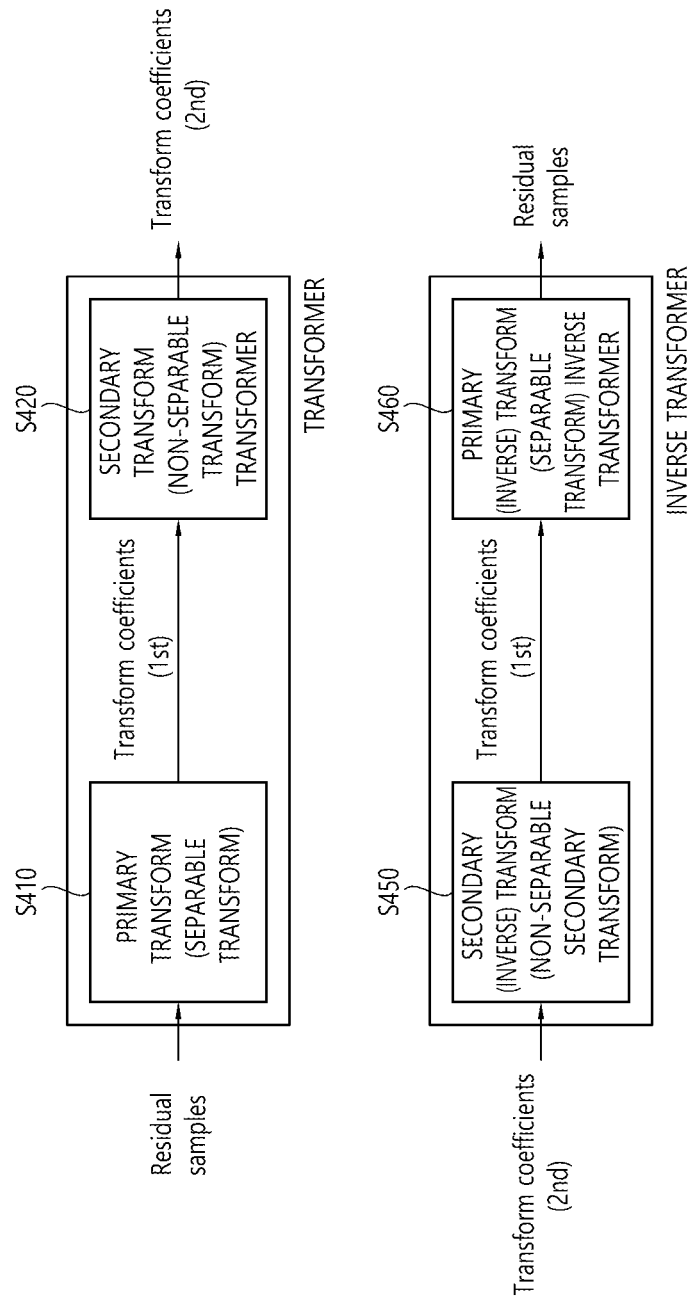
FIG. 4 schematically illustrates a multiple transform scheme according to an embodiment of the present document.

FIG. 4 schematically illustrates a multiple transform technique according to an embodiment of the present disclosure.

Referring to FIG. 4, a transformer may correspond to the transformer in the foregoing encoding apparatus of FIG. 2, and an inverse transformer may correspond to the inverse transformer in the foregoing encoding apparatus of FIG. 2, or to the inverse transformer in the decoding apparatus of FIG. 3.

The transformer may derive (primary) transform coefficients by performing a primary transform based on residual samples (residual sample array) in a residual block (S410). This primary transform may be referred to as a core transform. Herein, the primary transform may be based on multiple transform selection (MTS), and when a multiple transform is applied as the primary transform, it may be referred to as a multiple core transform.

The multiple core transform may represent a method of transforming additionally using discrete cosine transform (DCT) type 2 and discrete sine transform (DST) type 7, DCT type 8, and/or DST type 1. That is, the multiple core transform may represent a transform method of transforming a residual signal (or residual block) of a space domain into transform coefficients (or primary transform coefficients) of a frequency domain based on a plurality of transform kernels selected from among the DCT type 2, the DST type 7, the DCT type 8 and the DST type 1. Herein, the primary transform coefficients may be called temporary transform coefficients from the viewpoint of the transformer.

That is, when the conventional transform method is applied, transform coefficients may be generated by applying transform from a space domain to a frequency domain to a residual signal (or residual block) based on DCT type 2. However, when the multiple core transform is applied, transform coefficients (or primary transform coefficients) may be generated by applying transform from a space domain to a frequency domain to a residual signal (or residual block) based on DCT type 2, DST type 7, DCT type 8, and/or DST type 1. Here, DCT type 2, DST type 7, DCT type 8, and DST type 1 may be referred to as transform types, transform kernels, or transform cores. These DCT/DST types may be defined based on basis functions.

If the multiple core transform is performed, then a vertical transform kernel and a horizontal transform kernel for a target block may be selected from among the transform kernels, a vertical transform for the target block may be performed based on the vertical transform kernel, and a horizontal transform for the target block may be performed based on the horizontal transform kernel. Here, the horizontal transform may represent a transform for horizontal components of the target block, and the vertical transform may represent a transform for vertical components of the target block. The vertical transform kernel/horizontal transform kernel may be adaptively determined based on a prediction mode and/or a transform index of a target block (CU or sub-block) including a residual block.

Further, according to an example, if the primary transform is performed by applying the MTS, a mapping relationship for transform kernels may be set by setting specific basis functions to predetermined values and combining basis functions to be applied in the vertical transform or the horizontal transform. For example, when the horizontal transform kernel is expressed as trTypeHor and the vertical direction transform kernel is expressed as trTypeVer, a trTypeHor or trTypeVer value of 0 may be set to DCT2, a trTypeHor or trTypeVer value of 1 may be set to DST-7, and a trTypeHor or trTypeVer value of 2 may be set to DCT-8.

In this case, MTS index information may be encoded and signaled to the decoding apparatus to indicate any one of a plurality of transform kernel sets. For example, an MTS index of 0 may indicate that both trTypeHor and trTypeVer values are 0, an MTS index of 1 may indicate that both trTypeHor and trTypeVer values are 1, an MTS index of 2 may indicate that the trTypeHor value is 2 and the trTypeVer value. Is 1, an MTS index of 3 may indicate that the trTypeHor value is 1 and the trTypeVer value is 2, and an MTS index of 4 may indicate that both both trTypeHor and trTypeVer values are 2.

In one example, transform kernel sets according to MTS index information are illustrated in the following table.

TABLE 1

| tu_mts_idx[ x0 ][ y0 ] | 0 | 1 | 2 | 3 | 4 |
|---|---|---|---|---|---|
| trTypeHor | 0 | 1 | 2 | 1 | 2 |
| trTypeVer | 0 | 1 | 1 | 2 | 2 |

The transformer may derive modified (secondary) transform coefficients by performing the secondary transform based on the (primary) transform coefficients (S420). The primary transform is a transform from a spatial domain to a frequency domain, and the secondary transform refers to transforming into a more compressive expression by using a correlation existing between (primary) transform coefficients. The secondary transform may include a non-separable transform. In this case, the secondary transform may be called a non-separable secondary transform (NSST), or a mode-dependent non-separable secondary transform (MDNSST). The non-separable secondary transform may represent a transform which generates modified transform coefficients (or secondary transform coefficients) for a residual signal by secondary-transforming, based on a non-separable transform matrix, (primary) transform coefficients derived through the primary transform. At this time, the vertical transform and the horizontal transform may not be applied separately (or horizontal and vertical transforms may not be applied independently) to the (primary) transform coefficients, but the transforms may be applied at once based on the non-separable transform matrix. In other words, the non-separable secondary transform may represent a transform method in which is not separately applied in the vertical direction and the horizontal direction for the (primary) transform coefficients, and for example, two-dimensional signals (transform coefficients) are re-arranged to a one-dimensional signal through a certain determined direction (e.g., row-first direction or column-first direction), and then modified transform coefficients (or secondary transform coefficients) are generated based on the non-separable transform matrix. For example, according to a row-first order, M×N blocks are disposed in a line in an order of a first row, a second row, . . . , and an Nth row. According to a column-first order, M×N blocks are disposed in a line in an order of a first column, a second column, . . . , and an Nth column. The non-separable secondary transform may be applied to a top-left region of a block configured with (primary) transform coefficients (hereinafter, may be referred to as a transform coefficient block). For example, if the width (W) and the height (H) of the transform coefficient block are all equal to or greater than 8, an 8×8 non-separable secondary transform may be applied to a top-left 8×8 region of the transform coefficient block. Further, if the width (W) and the height (H) of the transform coefficient block are all equal to or greater than 4, and the width (W) or the height (H) of the transform coefficient block is less than 8, then a 4×4 non-separable secondary transform may be applied to a top-left min(8,W)×min(8,H) region of the transform coefficient block. However, the embodiment is not limited to this, and for example, even if only the condition that the width (W) or height (H) of the transform coefficient block is equal to or greater than 4 is satisfied, the 4×4 non-separable secondary transform may be applied to the top-left min(8, W)×min(8,H) region of the transform coefficient block.

Here, to select a transform kernel, two non-separable secondary transform kernels per transform set for a non-separable secondary transform may be configured for both the 8×8 transform and the 4×4 transform, and there may be four transform sets. That is, four transform sets may be configured for the 8×8 transform, and four transform sets may be configured for the 4×4 transform. In this case, each of the four transform sets for the 8×8 transform may include two 8×8 transform kernels, and each of the four transform sets for the 4×4 transform may include two 4×4 transform kernels.

However, as the size of the transform, that is, the size of a region to which the transform is applied, may be, for example, a size other than 8×8 or 4×4, the number of sets may be n, and the number of transform kernels in each set may be k.

The transform set may be referred to as an NSST set or an LFNST set. A specific set among the transform sets may be selected, for example, based on the intra prediction mode of the current block (CU or subblock). A low-frequency non-separable transform (LFNST) may be an example of a reduced non-separable transform, which will be described later, and represents a non-separable transform for a low frequency component.

According to an example, the four transform sets according to the intra prediction mode may be mapped, for example, as shown in the following table.

TABLE 2

| predModeIntra | lfnstTrSetIdx |
|---|---|
| predModeIntra < 0 | 1 |
| 0 <= predModeIntra <= 1 | 0 |
| 2 <= predModeIntra <= 12 | 1 |
| 13 <= predModeIntra <= 23 | 2 |
| 24 <= predModeIntra <= 44 | 3 |
| 45 <= predModeIntra <= 55 | 2 |
| 56 <= predModeIntra <= 80 | 1 |

As shown in Table 2, any one of the four transform sets, that is, lfnstTrSetIdx, may be mapped to any one of four indexes, that is, 0 to 3, according to the intra prediction mode.

When it is determined that a specific set is used for the non-separable transform, one of k transform kernels in the specific set may be selected through a non-separable secondary transform index. An encoding apparatus may derive a non-separable secondary transform index indicating a specific transform kernel based on a rate-distortion (RD) check and may signal the non-separable secondary transform index to a decoding apparatus. The decoding apparatus may select one of the k transform kernels in the specific set based on the non-separable secondary transform index. For example, lfnst index value 0 may refer to a first non-separable secondary transform kernel, lfnst index value 1 may refer to a second non-separable secondary transform kernel, and lfnst index value 2 may refer to a third non-separable secondary transform kernel. Alternatively, lfnst index value 0 may indicate that the first non-separable secondary transform is not applied to the target block, and lfnst index values 1 to 3 may indicate the three transform kernels.

The transformer may perform the non-separable secondary transform based on the selected transform kernels, and may obtain modified (secondary) transform coefficients. As described above, the modified transform coefficients may be derived as transform coefficients quantized through the quantizer, and may be encoded and signaled to the decoding apparatus and transferred to the dequantizer/inverse transformer in the encoding apparatus.

Meanwhile, as described above, if the secondary transform is omitted, (primary) transform coefficients, which are an output of the primary (separable) transform, may be derived as transform coefficients quantized through the quantizer as described above, and may be encoded and signaled to the decoding apparatus and transferred to the dequantizer/inverse transformer in the encoding apparatus.

The inverse transformer may perform a series of procedures in the inverse order to that in which they have been performed in the above-described transformer. The inverse transformer may receive (dequantized) transformer coefficients, and derive (primary) transform coefficients by performing a secondary (inverse) transform (S450), and may obtain a residual block (residual samples) by performing a primary (inverse) transform on the (primary) transform coefficients (S460). In this connection, the primary transform coefficients may be called modified transform coefficients from the viewpoint of the inverse transformer. As described above, the encoding apparatus and the decoding apparatus may generate the reconstructed block based on the residual block and the predicted block, and may generate the reconstructed picture based on the reconstructed block.

The decoding apparatus may further include a secondary inverse transform application determinator (or an element to determine whether to apply a secondary inverse transform) and a secondary inverse transform determinator (or an element to determine a secondary inverse transform). The secondary inverse transform application determinator may determine whether to apply a secondary inverse transform. For example, the secondary inverse transform may be an NSST, an RST, or an LFNST and the secondary inverse transform application determinator may determine whether to apply the secondary inverse transform based on a secondary transform flag obtained by parsing the bitstream. In another example, the secondary inverse transform application determinator may determine whether to apply the secondary inverse transform based on a transform coefficient of a residual block.

The secondary inverse transform determinator may determine a secondary inverse transform. In this case, the secondary inverse transform determinator may determine the secondary inverse transform applied to the current block based on an LFNST (NSST or RST) transform set specified according to an intra prediction mode. In an embodiment, a secondary transform determination method may be determined depending on a primary transform determination method. Various combinations of primary transforms and secondary transforms may be determined according to the intra prediction mode. Further, in an example, the secondary inverse transform determinator may determine a region to which a secondary inverse transform is applied based on the size of the current block.

Meanwhile, as described above, if the secondary (inverse) transform is omitted, (dequantized) transform coefficients may be received, the primary (separable) inverse transform may be performed, and the residual block (residual samples) may be obtained. As described above, the encoding apparatus and the decoding apparatus may generate the reconstructed block based on the residual block and the predicted block, and may generate the reconstructed picture based on the reconstructed block.

In the present document, reduced secondary transform (RST) in which the size of a transform matrix (kernel) is reduced may be applied in the concept of NSST in order to reduce the amount of computation and memory required for the non-separable secondary transform. RST is generally performed in a low-frequency region including a non-zero coefficient in a transform block, and may thus be referred to as low-frequency non-separable transform (LFNST). The transform index may be referred to as an LFNST index.

In the present specification, LFNST may refer to a transform which is performed on residual samples for a target block based on a transform matrix having a reduced size. In the case of performing the reduced transform, the amount of computation required for transform may be reduced due to a reduction in the size of the transform matrix. That is, the LFNST may be used to address the computational complexity issue occurring at the non-separable transform or the transform of a block of a great size.

When the secondary inverse transform is performed based on LFNST, the inverse transformer 235 of the encoding apparatus 200 and the inverse transformer 322 of the decoding apparatus 300 may include an inverse reduced secondary transformer which derives modified transform coefficients based on the inverse RST of the transform coefficients, and an inverse primary transformer which derives residual samples for the target block based on the inverse primary transform of the modified transform coefficients. The inverse primary transform refers to the inverse transform of the primary transform applied to the residual. In the present document, deriving a transform coefficient based on a transform may refer to deriving a transform coefficient by applying the transform.

Figure 5A:
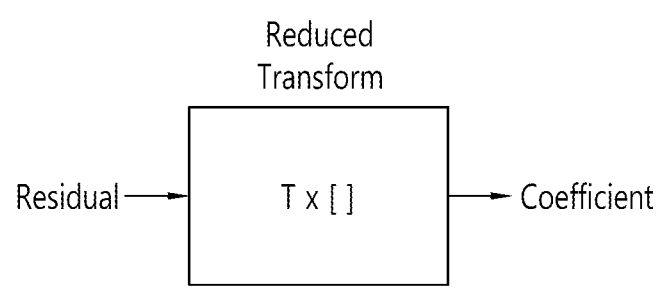
FIGS. 5A and 5B illustrate an RST according to an embodiment of the present document.
Figure 5B:
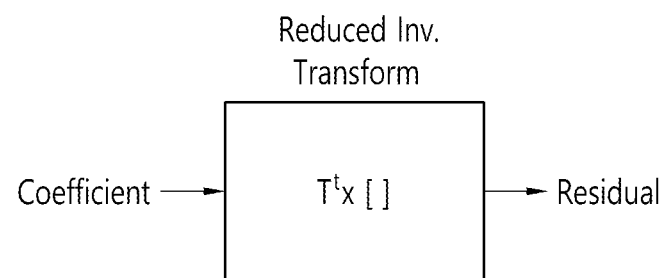

FIGS. 5A and 5B are diagrams illustrating an RST according to an embodiment of the present disclosure.

In the present disclosure, a "target block" may refer to a current block to be coded, a residual block, or a transform block.

In the RST according to an example, an N-dimensional vector may be mapped to an R-dimensional vector located in another space, so that the reduced transform matrix may be determined, where R is less than N. N may mean the square of the length of a side of a block to which the transform is applied, or the total number of transform coefficients corresponding to a block to which the transform is applied, and the reduced factor may mean an R/N value. The reduced factor may be referred to as a reduced factor, reduction factor, simplified factor, simple factor or other various terms. Meanwhile, R may be referred to as a reduced coefficient, but according to circumstances, the reduced factor may mean R. Further, according to circumstances, the reduced factor may mean the N/R value.

In an example, the reduced factor or the reduced coefficient may be signaled through a bitstream, but the example is not limited to this. For example, a predefined value for the reduced factor or the reduced coefficient may be stored in each of the encoding apparatus 200 and the decoding apparatus 300, and in this case, the reduced factor or the reduced coefficient may not be signaled separately.

The size of the reduced transform matrix according to an example may be R×N less than N×N, the size of a conventional transform matrix, and may be defined as in Equation 1 below.

$$T_{R \times N} = \begin{bmatrix} t_{11} & t_{12} & t_{13} & \cdots & t_{1N} \\ t_{21} & t_{22} & t_{23} & & t_{2N} \\ \vdots & & \ddots & & \vdots \\ t_{R1} & t_{R2} & t_{R3} & \cdots & t_{RN} \end{bmatrix} \quad \text{[Equation 1]}$$

The matrix T in the Reduced Transform block shown in FIG. 5A may mean the matrix $T_{R \times N}$ of Equation 1. As shown in FIG. 5A, when the reduced transform matrix $T_{R \times N}$ is multiplied to residual samples for the target block, transform coefficients for the target block may be derived.

In an example, if the size of the block to which the transform is applied is 8×8 and R=16 (i.e., R/N=16/64=1/4), then the RST according to FIG. 5A may be expressed as a matrix operation as shown in Equation 2 below. In this case, memory and multiplication calculation can be reduced to approximately 1/4 by the reduced factor.

In the present disclosure, a matrix operation may be understood as an operation of multiplying a column vector by a matrix, disposed on the left of the column vector, to obtain a column vector.

$$\begin{bmatrix} t_{1,1} & t_{1,2} & t_{1,3} & \cdots & t_{1,64} \\ t_{2,1} & t_{2,2} & t_{2,3} & & t_{2,64} \\ \vdots & & \ddots & & \vdots \\ t_{16,1} & t_{16,2} & t_{16,3} & \cdots & t_{16,64} \end{bmatrix} \times \begin{bmatrix} r_1 \\ r_2 \\ \vdots \\ r_{64} \end{bmatrix} \quad \text{[Equation 2]}$$

In Equation 2, $r_1$ to $r_{64}$ may represent residual samples for the target block and may be specifically transform coefficients generated by applying a primary transform. As a result of the calculation of Equation 2 transform coefficients ci for the target block may be derived, and a process of deriving ci may be as in Equation 3.

[Equation 3]

for i from to R:
  $c_i$=0
  for j from 1 to N
    $c_i$ += $t_{i,j} * r_j$

As a result of the calculation of Equation 3, transform coefficients $c_1$ to $c_R$ for the target block may be derived. That is, when R=16, transform coefficients $c_1$ to $c_{16}$ for the target block may be derived. If, instead of RST, a regular transform is applied and a transform matrix of 64×64 (N×N) size is multiplied to residual samples of 64×1 (N×1) size, then only 16 (R) transform coefficients are derived for the target block because RST was applied, although 64 (N) transform coefficients are derived for the target block. Since the total number of transform coefficients for the target block is reduced from N to R, the amount of data transmitted by the encoding apparatus 200 to the decoding apparatus 300 decreases, so efficiency of transmission between the encoding apparatus 200 and the decoding apparatus 300 can be improved.

When considered from the viewpoint of the size of the transform matrix, the size of the regular transform matrix is 64×64 (N×N), but the size of the reduced transform matrix is reduced to 16×64 (R×N), so memory usage in a case of performing the LFNST can be reduced by an R/N ratio when compared with a case of performing the regular transform. In addition, when compared to the number of multiplication calculations N×N in a case of using the regular transform matrix, the use of the reduced transform matrix can reduce the number of multiplication calculations by the R/N ratio (R×N).

In an example, the transformer 232 of the encoding apparatus 200 may derive transform coefficients for the target block by performing the primary transform and the RST-based secondary transform on residual samples for the target block. These transform coefficients may be transferred to the inverse transformer of the decoding apparatus 300, and the inverse transformer 322 of the decoding apparatus 300 may derive the modified transform coefficients based on the inverse reduced secondary transform (RST) for the transform coefficients, and may derive residual samples for the target block based on the inverse primary transform for the modified transform coefficients.

The size of the inverse RST matrix $T_{N \times R}$ according to an example is N×R less than the size N×N of the regular inverse transform matrix, and is in a transpose relationship with the reduced transform matrix $T_{R \times N}$ shown in Equation 4.

The matrix $T^t$ in the Reduced Inv. Transform block shown in FIG. 5B may mean the inverse RST matrix $T_{R \times N}^T$ (the superscript T means transpose). When the inverse RST matrix $T_{R \times N}^T$ is multiplied to the transform coefficients for the target block as shown in FIG. 5B, the modified transform coefficients for the target block or the residual samples for the current block may be derived. The inverse RST matrix $T_{R \times N}^T$ may be expressed as $(T_{R \times N}^T)_{N \times R}$.

More specifically, when the inverse RST is applied as the secondary inverse transform, the modified transform coefficients for the target block may be derived when the inverse RST matrix $T_{R \times N}^T$ is multiplied to the transform coefficients for the target block. Meanwhile, the inverse RST may be applied as the inverse primary transform, and in this case, the residual samples for the target block may be derived when the inverse RST matrix $T_{R \times N}^T$ is multiplied to the transform coefficients for the target block.

In an example, if the size of the block to which the inverse transform is applied is 8×8 and R=16 (i.e., R/N=16/64=1/4), then the RST according to FIG. 5B may be expressed as a matrix operation as shown in Equation 4 below.

$$\begin{bmatrix} t_{1,1} & t_{2,1} & & t_{16,1} \\ t_{1,2} & t_{2,2} & \cdots & t_{16,2} \\ t_{1,3} & t_{2,3} & & t_{16,3} \\ \vdots & & \ddots & \vdots \\ t_{1,64} & t_{2,64} & \cdots & t_{16,64} \end{bmatrix} \times \begin{bmatrix} c_1 \\ c_2 \\ \vdots \\ c_{16} \end{bmatrix}$$

[Equation 4]

In Equation 4, $c_1$ to $c_{16}$ may represent the transform coefficients for the target block. As a result of the calculation of Equation 4, $r_i$ representing the modified transform coefficients for the target block or the residual samples for the target block may be derived, and the process of deriving $r_i$ may be as in Equation 5.

[Equation 5]

For i from 1 to N
  $r_i$=0
  for j from 1 to R
    $r_i$ += $t_{ji} * c_j$

As a result of the calculation of Equation 5, $r_1$ to $r_N$ representing the modified transform coefficients for the target block or the residual samples for the target block may be derived. When considered from the viewpoint of the size of the inverse transform matrix, the size of the regular inverse transform matrix is 64×64 (N×N), but the size of the reduced inverse transform matrix is reduced to 64×16 (R×N), so memory usage in a case of performing the inverse RST can be reduced by an R/N ratio when compared with a case of performing the regular inverse transform. In addition, when compared to the number of multiplication calculations N×N in a case of using the regular inverse transform matrix, the use of the reduced inverse transform matrix can reduce the number of multiplication calculations by the R/N ratio (N×R).

According to an embodiment of the present disclosure, for a transform in an encoding process, only 48 pieces of data may be selected and a maximum 16×48 transform kernel matrix may be applied thereto, rather than applying a 16×64 transform kernel matrix to 64 pieces of data forming an 8×8 region. Here, "maximum" means that m has a maximum value of 16 in an m×48 transform kernel matrix for generating m coefficients. That is, when an RST is performed by applying an m×48 transform kernel matrix (m≤16) to an 8×8 region, 48 pieces of data are input and m coefficients are generated. When m is 16, 48 pieces of data are input and 16 coefficients are generated. That is, assuming that 48 pieces of data form a 48×1 vector, a 16×48 matrix and a 48×1 vector are sequentially multiplied, thereby generating a 16×1 vector. Here, the 48 pieces of data forming the 8×8 region may be properly arranged, thereby forming the 48×1 vector. For example, a 48×1 vector may be constructed based on 48 pieces of data constituting a region excluding the bottom right 4×4 region among the 8×8 regions. Here, when a matrix operation is performed by applying a maximum 16×48 transform kernel matrix, 16 modified transform coefficients are generated, and the 16 modified transform coefficients may be arranged in a top-left 4×4 region according to a scanning order, and a top-right 4×4 region and a bottom-left 4×4 region may be filled with zeros.

For an inverse transform in a decoding process, the transposed matrix of the foregoing transform kernel matrix may be used. That is, when an inverse RST or LFNST is performed in the inverse transform process performed by the decoding apparatus, input coefficient data to which the inverse RST is applied is configured in a one-dimensional vector according to a predetermined arrangement order, and a modified coefficient vector obtained by multiplying the one-dimensional vector and a corresponding inverse RST matrix on the left of the one-dimensional vector may be arranged in a two-dimensional block according to a predetermined arrangement order.

In summary, in the transform process, when an RST or LFNST is applied to an 8×8 region, a matrix operation of 48 transform coefficients in top-left, top-right, and bottom-left regions of the 8×8 region excluding the bottom-right region among transform coefficients in the 8×8 region and a 16×48 transform kernel matrix. For the matrix operation, the 48 transform coefficients are input in a one-dimensional array. When the matrix operation is performed, 16 modified transform coefficients are derived, and the modified transform coefficients may be arranged in the top-left region of the 8×8 region.

On the contrary, in the inverse transform process, when an inverse RST or LFNST is applied to an 8×8 region, 16 transform coefficients corresponding to a top-left region of the 8×8 region among transform coefficients in the 8×8 region may be input in a one-dimensional array according to a scanning order and may be subjected to a matrix operation with a 48×16 transform kernel matrix. That is, the matrix operation may be expressed as (48×16 matrix)*(16×1 transform coefficient vector)=(48×1 modified transform coefficient vector). Here, an n×1 vector may be interpreted to have the same meaning as an n×1 matrix and may thus be expressed as an n×1 column vector. Further, * denotes matrix multiplication. When the matrix operation is performed, 48 modified transform coefficients may be derived, and the 48 modified transform coefficients may be arranged in top-left, top-right, and bottom-left regions of the 8×8 region excluding a bottom-right region.

According to an example, an LFNST index may be signaled in a coding unit level as shown below in Table 3, and semantics of syntax elements is as shown in Table 4.

TABLE 3

| | Descriptor |
|---|---|
| coding_unit( x0, y0, cbWidth, cbHeight, cqtDepth, treeType, modeType ) { | |
| ...... | |
|   if( CuPredMode[ chType ][ x0 ][ y0 ] != MODE_INTRA && !pred_mode_plt_flag && | |
|     general_merge_flag[ x0 ][ y0 ] = = 0 ) | |
|     cu_coded_flag | ae(v) |
|   if( cu_coded_flag ) { | |
| ...... | |
|     LfnstDcOnly = 1 | |
|     LfnstZeroOutSigCoeffFlag = 1 | |
|     MtsDcOnly = 1 | |
|     MtsZeroOutSigCoeffFlag = 1 | |
|     transform_tree( x0, y0, cbWidth, cbHeight, treeType, chType ) | |
|     lfnstWidth = ( treeType = = DUAL_TREE_CHROMA ) ? cbWidth / SubWidthC : | |
|       ( ( IntraSubPartitionsSplitType = = ISP_VER_SPLIT ) ? | |
|         cbWidth / NumIntraSubPartitions : cbWidth ) | |
|     lfnstHeight = ( treeType = = DUAL_TREE_CHROMA ) ? cbHeight / SubHeightC : | |
|       ( ( IntraSubPartitionsSplitType = = ISP_HOR_SPLIT) ? | |
|         cbHeight / NumIntraSubPartitions : cbHeight ) | |
|     lfnstNotTsFlag = ( treeType = = DUAL_TREE_CHROMA \| \| | |
|         !tu_y_coded_flag[ x0 ][ y0 ] \| \| | |
|         transform_skip_flag[ x0 ][ y0 ][ 0 ] = = 0 ) && | |
|       ( treeType = = DUAL_TREE_LUMA \| \| | |
|         ( ( !tu_cb_coded_flag[ x0 ][ y0 ] \| \| | |
|         transform_skip_flag[ x0 ][ y0 ][ 1 ] = = 0 ) && | |
|         ( !tu_cr_coded_flag[ x0 ][ y0 ] \| \| | |
|         transform_skip_flag[ x0 ][ y0 ][ 2 ] = = 0 ) ) ) | |
|     if( Min( lfnstWidth, lfnstHeight ) >= 4 && sps_lfnst_enabled_flag = = 1 && | |
|       CuPredMode[ chType ][ x0 ][ y0 ] = = MODE_INTRA && lfnstNotTsFlag = = 1 && | |
|       ( treeType = = DUAL_TREE_CHROMA \| \| !intra_mip_flag[ x0 ][ y0 ] \| \| | |
|         Min( lfnstWidth, lfnstHeight ) >= 16 ) && | |
|       Max( cbWidth, cbHeight ) <= MaxTbSizeY ) { | |
|       if( ( IntraSubPartitionsSplitType != ISP_NO_SPLIT \| \| LfnstDcOnly = = 0 ) && | |
|         LfnstZeroOutSigCoeffFlag = = 1 ) | |
|         lfnst_idx | ae(v) |
|     if( treeType != DUAL_TREE_CHROMA && lfnst_idx = = 0 && | |
|       transform_skip_flag[ x0 ][ y0 ][ 0 ] = = 0 && Max( cbWidth, cbHeight ) <= 32 && | |
|       IntraSubPartitionsSplitType = = ISP_NO_SPLIT && cu_sbt_flag = = 0 && | |
|       MtsZeroOutSigCoeffFlag = = 1 && MtsDcOnly = = 0 ) { | |
|       if( ( ( CuPredMode[ chType ][ x0 ][ y0 ] = = MODE_INTER && | |
|         sps_explicit_mts_inter_enabled_flag ) \| \| | |
|       ( CuPredMode[ chType ][ x0 ][ y0 ] = = MODE_INTRA && | |
|         sps_explicit_mts_intra_enabled_flag ) ) | |

TABLE 3-continued

|  | Descriptor |
|---|---|
| mts_idx | ae(v) |
| } | |
| } | |
| } | |
| } | |

TABLE 4

7.4.11.5 Coding unit semantics
......
lfnst_idx specifies whether and which one of the two frequency non-separable transform kernels in a selected transform set is used. lfnst_idx equal to 0 specifies that the low frequency non-separable transform is not used in the current coding unit.
When lfnst_idx is not present, it is inferred to be equal to 0.
The variable ApplyLfnstFlag is derived as follows:
- If treeType is equal to SINGLE_TREE, the following applies:
    ApplyLfnstFlag = ( lfnst_idx > 0 && cIdx = = 0 ) ? 1 : 0    (177)
- Otherwise, the following applies:
    ApplyLfnstFlag = ( lfnst_idx > 0 ) ? 1 : 0    (178)
......

In Table 4, ApplyLfnstFlag is a variable indicating whether an LFNST is applied, and is referred to in "8.7.3 Scaling process for transform coefficients" in Table 5 and "8.7.4 Transformation process for scaled transform coefficients" in Table 6. Table 5 is specification text describing a dequantization process of quantized transform coefficients received from a bitstream, and Table 6 is specification text describing a transformation process of dequantized transform coefficients.

In Table 5, when the value of ApplyLfnstFlag is 1 and the value of sps_scaling_matrix_for_lfnst_disabled_flag is 1 for a color component designated by cIdx, a scaling list is not applied in quantization/dequantization for the color component.

Here, sps_scaling_matrix_for_lfnst_disabled_flag is a syntax element defined in a sequence parameter set, and the value thereof equal to 1 indicates that the scaling list is not applied when the LFNST is applied. Setting m[x][y] to 16 indicates that no scaling list is applied.

As shown in Table 6, when the value of ApplyLfnstFlag is 1, the LFNST is applied to the component indicated by cIdx, and when the value is 0, no LFNST is applied to the component. Further, in Table 6, when the value of ApplyLfnstFlag is 1 for the component indicated by cIdx, the values of a nonZeroW variable and a nonZeroH variable indicating a region where an LFNST transform coefficient may exist are set. nonZeroW and nonZeroH denote the width and height of a top-left region in a corresponding transform block, respectively.

Specifically, in the current VVC standard, when a currently coded coding unit (CU) is coded in a single tree structure, an LFNST may be applied only to a luma component. In a luma separate tree and a chroma separate tree, that is, in a dual tree structure, an LFNST may be applied to each of a luma component and a chroma component. Therefore, when where coding is performed in the single tree structure (SINGLE_TREE) as in Table 4, if a condition "lfnst_idx>0 && cIdx==0" is satisfied, the value of ApplyLfnstFlag value may be 1 only for the luma component.

A cIdx value of 0 indicates a luma component, and a cIdx value of 1 or 2 indicates a chroma component (Cb and Cr, respectively). An lfnst_idx value of 0 indicates that no LFNST is applied, and an lfnst_idx value greater than 0 indicates that an LFNST is applied.

TABLE 5

8.7.3 Scaling process for transform coefficients
Inputs to this process are:
- a luma location ( xTbY, yTbY ) specifying the top-left sample of the current luma transform block relative to the top-left luma sample of the current picture,
- a variable nTbW specifying the transform block width,
- a variable nTbH specifying the transform block height,
- a variable predMode specifying the prediction mode of the coding unit,
- a variable cIdx specifying the colour component of the current block.
Output of this process is the (nTbW)x(nTbH) array d of the scaled transform coefficients with elements d[ x ][ y ].
......
For the derivation of the scaled transform coefficients d[ x ][ y ] with x = 0..nTbW − 1, y = 0..nTbH − 1, the following applies:
- The intermediate scaling factor m[ x ][ y ] is derived as follows:
  - If one or more of the following conditions are true, m[ x ][ y ] is set equal to 16:
    - sh_explicit_scaling_list_used_flag is equal to 0.
    - transform_skip_flag[ xTbY ][ yTbY ][ cIdx ] is equal to 1.
    - sps_scaling_matrix_for_lfnst_disabled_flag is equal to 1 and ApplyLfnstFlag is equal to 1.
    - sps_scaling_matrix_for_alternative_colour_space_disabled_flag is equal to 1 and sps_scaling_matrix_designated_colour_space_flag is equal to cu_act_enabled_flag[ xTbY ][ yTbY ].

TABLE 5-continued

- Otherwise, the following applies:
......

TABLE 6

8.7.4 Transformation process for scaled transform coefficients
8.7.4.1 General
Inputs to this process are:
- a luma location ( xTbY, yTbY ) specifying the top-left sample of the current luma transform block relative to the top-left luma sample of the current picture,
- a variable nTbW specifying the width of the current transform block,
- a variable nTbH specifying the height of the current transform block,
- a variable cIdx specifying the colour component of the current block,
- an (nTbW)x(nTbH) array d[ x ][ y ] of scaled transform coefficients with x = 0..nTbW − 1, y = 0..nTbH − 1.

Output of this process is the (nTbW)x(nTbH) array res[ x ][ y ] of residual samples with x = 0..nTbW − 1, y = 0..nTbH − 1.
When ApplyLfnstFlag is equal to 1, transform_skip_flag[ xTbY ][ yTbY ][ cIdx ] is equal to 0 and both nTbW and nTbH are greater than or equal to 4, the following applies:
- The variables predModeIntra, nLfnstOutSize, log2LfnstSize, nLfnstSize, and nonZeroSize are derived as follows:

```
predModeIntra                                                                    =
( cIdx = = 0 ) ? IntraPredModeY[ xTbY ][ yTbY ] : IntraPredModeC[ xTbY ][ yTbY ]        (1178)
nLfnstOutSize = ( nTbW >= 8 && nTbH >= 8 ) ? 48 : 16                             (1179)
log2LfnstSize = ( nTbW >= 8 && nTbH >= 8 ) ? 3 : 2                               (1180)
nLfnstSize = 1 << log2LfnstSize                                                  (1181)
nonZeroSize = ( ( nTbW = = 4 && nTbH = = 4 )                                     | |
( nTbW = = 8 && nTbH = = 8 ) ) ? 8 : 16                                          (1182)
```

- When intra_mip_flag[ xTbY ][ yTbY ] is equal to 1 and cIdx is equal to 0, predModeIntra is set equal to INTRA_PLANAR.
- When predModeIntra is equal to either INTRA_LT_CCLM, INTRA_L_CCLM, or INTRA_T_CCLM, predModeIntra is derived as follows:
    - If intra_mip_flag[ xTbY + nTbW * SubWidthC / 2 ][ yTbY + nTbH * SubHeightC / 2 ] is equal to 1, predModeIntra is set equal to INTRA_PLANAR.
    - Otherwise, CuPredMode[ 0 ][ xTbY + nTbW * SubWidthC / 2 ][ yTbY + nTbH * SubHeightC / 2 ] is equal to MODE_IBC or MODE_PLT, predModeIntra is set equal to INTRA_DC.
    - Otherwise, predModeIntra is set equal to IntraPredModeY[ xTbY + nTbW * SubWidthC / 2 ][ yTbY + nTbH * SubHeightC / 2 ].
- The wide angle intra prediction mode mapping process as specified in clause 8.4.5.2.6 is invoked with predModeIntra, nTbW, nTbH and cIdx as inputs, and the modified predModeIntra as output.
- The values of the list u[ x ] with x = 0..nonZeroSize − 1 are derived as follows:

```
xC=DiagScanOrder[ 2 ][ 2 ][ x ][ 0 ]
                                                                                 (1183)
yC=DiagScanOrder[ 2 ][ 2 ][ x ][ 1 ]                                             (1184)
u[ x ] = d[ xC ][ yC ]                                                           (1185)
```

- The one-dimensional low frequency non-separable transformation process as specified in clause 8.7.4.2 is invoked with the input length of the scaled transform coefficients nonZeroSize, the transform output length nTrS set equal to nLfnstOutSize, the list of scaled non-zero tranform coefficients u[ x ] with x = 0..nonZeroSize − 1, and the intra prediction mode for LFNST set selection predModeIntra as inputs, and the list v[ x ] with x = 0..nLfnstOutSize − 1 as output.
- The array d[ x ][ y ] with x = 0..nLfnstSize − 1, y = 0..nLfnstSize − 1 is derived as follows:
    - If predModeIntra is less than or equal to 34, the following applies:

```
d[ x ][ y ] = ( y < 4 ) ? v[ x + ( y << log2LfnstSize ) ] :                      (1186)
        ( ( x < 4 ) ? v[ 32 + x + ( ( y − 4 ) << 2 ) ] : d[ x ][ y ] )
```

- Otherwise, the following applies:

```
d[ x ][ y ] = ( x < 4 ) ? v[ y + ( x << log2LfnstSize ) ] :                      (1187)
        ( ( y < 4 ) ? v[ 32 + y + ( ( x − 4 ) << 2 ) ] : d[ x ][ y ] )
```
......

The variables nonZeroW and nonZeroH are derived as follows:
- If ApplyLfnstFlag is equal to 1 and nTbW is greater than or equal to 4 and nTbH is greater than or equal to 4, the following applies:

```
nonZeroW = ( nTbW = = 4 | | nTbH = = 4 ) ? 4 : 8                                 (1190)
nonZeroH = ( nTbW = = 4 | | nTbH = = 4 ) ? 4 : 8                                 (1191)
```

- Otherwise, the following applies:

```
nonZeroW = Min( nTbW, ( trTypeHor > 0 ) ? 16 : 32 )                              (1192)
nonZeroH = Min( nTbH, (trTypeVer > 0 ) ? 16 : 32 )                               (1193)
```

The (nTbW)x(nTbH) array r of the residual samples is derived as follows:
......

However, since the cIdx value is not defined in the coding unit syntax table as shown in Table 3, the cIdx value cannot be referred to when signaling lfnst_idx. Further, since lfnst_idx in Table 3 is signaled once for each coding unit, the same lfnst_idx value is applied to all components forming the coding unit.

Therefore, when determining the value of the ApplyLfnstFlag variable in Table 4, the cIdx value cannot be basically referred to. However, to perform the image coding process as described in Table 5 and Table 6, the ApplyLfnstFlag value needs to change as the cIdx value changes. For example, when the current coding unit is coded in a single tree structure and the LFNST is applied (lfnst_idx>0), as the cIdx value change to 0, 1, and 2, the ApplyLfnstFlag value needs to be set to 1, 0, and 0, respectively.

However, according to Table 4, when determining the value of the ApplyLfnstFlag variable, the cIdx value itself cannot be referred to, and the ApplyLfnstFlag value does not change according to the cIdx value.

To solve this problem, as shown in Table 7, a method of defining ApplyLfnstFlag as a one-dimensional array (ApplyLfnstFlag[cIdx]) having a value corresponding to each color component for each color component and referring to ApplyLfnstFlag[cIdx] may be proposed.

TABLE 7

7.4.11.5 Coding unit semantics
......
lfnst_idx specifies whether and which one of the two low frequency non-separable transform kernels in a selected transform set is used. lfnst_idx equal to 0 specifies that the low frequency non-separable transform is not used in the current coding unit.
When lfnst_idx is not present, it is inferred to be equal to 0.
The variable ApplyLfnstFlag[ cIdx ] is derived as follows for cIdx = 0..2:
    ApplyLfnstFlag[ 0 ] = ( lfnst_idx > 0 && treeType != DUAL_TREE_CHROMA ) ? 1 :
0                (177)|
    ApplyLfnstFlag[ 1 ] = ApplyLfnstFlag[ 2 ] =
                ( lfnst_idx > 0 && treeType = = DUAL_TREE_CHROMA ) ? 1 :
                0  (178)
......
8.7.3 Scaling process for transform coefficients
Inputs to this process are:
- a luma location ( xTbY, yTbY ) specifying the top-left sample of the current luma transform block relative to the top-left luma sample of the current picture,
- a variable nTbW specifying the transform block width,
- a variable nTbH specifying the transform block height,
- a variable predMode specifying the prediction mode of the coding unit,
- a variable cIdx specifying the colour component of the current block.
Output of this process is the (nTbW)x(nTbH) array d of scaled transform coefficients with elements d[ x ][ y ].
......
For the derivation of the scaled transform coefficients d[ x ][ y ] with x = 0..nTbW − 1, y = 0..nTbH − 1, the following applies:
- The intermediate scaling factor m[ x ][ y ] is derived as follows:
    - If one or more of the following conditions are true, m[ x ][ y ] is set equal to 16:
        - sh_explicit_scaling_list_used_flag is equal to 0.
        - transform_skip_flag[ xTbY ][ yTbY ][ cIdx ] is equal to 1.
        - sps_scaling_matrix_for_lfnst_disabled_flag is equal to 1 and ApplyLfnstFlag[ cIdx ] is equal to 1.
        - sps_scaling_matrix_for_alternative_colour_space_disabled_flag is equal to 1 and sps_scaling_matrix_designated_colour_space_flag is equal to cu_act_enabled_flag[ xTbY ][ yTbY ].
    - Otherwise, the following applies:
......
8.7.4 Transformation process for scaled transform coefficients
8.7.4.1 General
Inputs to this process are:
- a luma location ( xTbY, yTbY ) specifying the top-left sample of the current luma transform block relative to the top-left luma sample of the current picture,
- a variable nTbW specifying the width of the current transform block,
- a variable nTbH specifying the height of the current transform block,
- a variable cIdx specifying the colour component of the current block,
- an (nTbW)x(nTbH) array d[ x ][ y ] of scaled transform coefficients with x = 0..nTbW − 1, y = 0..nTbH − 1.
Output of this process is the (nTbW)x(nTbH) array res[ x ][ y ] of residual samples with x = 0..nTbW − 1, y = 0..nTbH − 1.
When ApplyLfnstFlag[ cIdx ] is equal to 1, transform_skip_flag[ xTbY ][ yTbY ][ cIdx ] is equal to 0 and both nTbW and nTbH are greater than or equal to 4, the following applies:
- The variables predModeIntra, nLfnstOutSize, log2LfnstSize, nLfnstSize, and nonZeroSize are derived as follows:
    predModeIntra = (1178)
    ( cIdx = = 0 ) ? IntraPredModeY[ xTbY ][ yTbY ] : IntraPredModeC[ xTbY ][ yTbY ]
    nLfnstOutSize = ( nTbW >= 8 && nTbH >= 8 ) ? 48 : 16 (1179)
    log2LfnstSize = ( nTbW >= 8 && nTbH >= 8 ) ? 3 : 2 (1180)
    nLfnstSize = 1 << log2LfnstSize (1181)
    nonZeroSize = ( ( nTbW = = 4 && nTbH = = 4 ) | |
    ( nTbW = = 8 && nTbH = = 8 ) ) ? 8 : 16 (1182)
......
The variables nonZeroW and nonZeroH are derived as follows:
- If ApplyLfnstFlag[ cIdx ] is equal to 1 and nTbW is greater than or equal to 4 and nTbH is greater than or equal to 4, the following applies:
    nonZeroW = ( nTbW = = 4 | | nTbH = = 4 ) ? 4 : 8 (1190)
    nonZeroH = ( nTbW = = 4 | | nTbH = = 4 ) ? 4 : 8 (1191)

TABLE 7-continued

- Otherwise, the following applies:
nonZeroW = Min( nTbW, ( trTypeHor > 0 ) ? 16 : 32 )  (1192)
nonZeroH = Min( nTbH, ( trTypeVer > 0 ) ? 16 : 32 )  (1193)
......

In Table 7, when the coding unit is coded in a single tree structure or a luma separate tree structure (i.e., a condition "treeType !=DUAL_TREE_CHROMA" in Table 7 is satisfied, where DUAL_TREE_CHROMA indicates a chroma separate tree), the ApplyLfnstFlag value may be 1 only for a luma component. That is, only the value of ApplyLfnstFlag[0] may be 1, and both ApplyLfnstFlag[1] and ApplyLfnstFlag[2] are 0.

When the coding unit is coded in a chroma separate tree structure (i.e., a condition "treeType==DUAL_TREE_CHROMA" in Table 7 is satisfied), the ApplyLfnstFlag value may be 1 only for a chroma component. That is, only the values of ApplyLfnstFlag[1] and ApplyLfnstFlag[2] may be 1, and ApplyLfnstFlag[0] is 0.

As shown in Table 7, all references to ApplyLfnstFlags in Table 5 and Table 6 are changed to those to ApplyLfnstFlag[cIdx].

Alternatively, according to another embodiment, whether the LFNST is applied may be controlled depending on whether the tree is a dual tree or a single tree, and specification text shown in Table 8 may be applied instead of Table 7.

TABLE 8

7.4.11.5 Coding unit semantics
......
lfnst_idx specifies whether and which one of the two low frequency non-separable transform kernels in
a selected transform set is used. lfnst_idx equal to 0 specifies that the low frequency non-separable
transform is not used in the current unit.
When lfnst_idx is not present, it is inferred to be equal to 0.
The variable ApplyLfnstFlag[ cIdx ] is derived as follows for cIdx = 0..2:
- If treeType is not equal to DUAL_TREE_CHROMA, the following applies:
    ApplyLfnstFlag[ 0 ] = ( lfnst_idx > 0 ) ? 1 : 0   (177)
- If treeType is not equal to DUAL_TREE_LUMA, the following applies:
    ApplyLfnstFlag[ 1 ] = ApplyLfnstFlag[ 2 ] =
             ( lfnst_idx > 0 && treeType = = DUAL_TREE_CHROMA ) ?
             1 : 0          (178)
......
8.7.3 Scaling process for transform coefficients
Inputs to this process are:
- a luma location ( xTbY, yTbY ) specifying the top-left sample of the current luma transform block
  relative to the top-left luma sample of the current picture,
- a variable nTbW specifying the transform block width,
- a variable nTbH specifying the transform block height,
- a varibale predMode specifying the prediction mode of the coding unit,
- a variable cIdx specifying the colour component of the current block.
Output of this process is the (nTbW)x(nTbH) array d of scaled transform coefficients with elements
  d[ x ][ y ].
......
For the derivation of the scaled transform coefficients d[ x ][ y ] with x = 0..nTbW − 1, y = 0..nTbH − 1,
the following applies:
- The intermediate scaling factor m[ x ][ y ] is derived as follows:
  - If one or more of the following conditions are true,
    m[ x ][ y ] is set equal to 16:
    - sh_explicit_scaling_list_used_flag is equal to 0.
    - transform_skip_flag[ xTbY ][ yTbY ][ cIdx ] is equal to 1.
    - sps_scaling_matrix_for_lfnst_disabled_flag is equal to 1 and
      ApplyLfnstFlag[ cIdx ] is
      equal to 1.
    - sps_scaling_matrix_for_alternative_colour_space_disabled_flag
      is equal to 1 and
      sps_scaling_matrix_designated_colour_space_flag is equal to
      cu_act_enabled_flag[ xTbY ][ yTbY ].
  - Otherwise, the following applies:
......
8.7.4 Transformation process for scaled transform coefficients
8.7.4.1 General
Inputs to this process are:
- a luma location ( xTbY, yTbY ) specifying the top-left sample of the current luma transform block
  relative to the top-left luma sample of the current picture,
- a variable nTbW specifying the width of the current transform block,
- a variable nTbH specifying the height of the current transform block,
- a variable cIdx specifying the colour component of the current block,
- an (nTbW)x(nTbH) array d[ x ][ y ] of scaled transform coefficients with x = 0..nTbW − 1,
  y = 0..nTbH − 1.

TABLE 8-continued

Output of this process is the (nTbW)x(nTbH) array res[ x ][ y ] of residual samples with
x = 0..nTbW − 1, y = 0..nTbH − 1.
When ApplyLfnstFlag[ cIdx ] is equal to 1, transform_skip_flag[ xTbY ][ yTbY ][ cIdx ] is equal to 0
and both nTbW and nTbH are greater than or equal to 4, the following applies:
- The variables predModeIntra, nLfnstOutSize, log2LfnstSize, nLfnstSize, and nonZeroSize are
  derived as follows:

| | |
|---|---|
| predModeIntra = ( cIdx = = 0 ) ? IntraPredModeY[ xTbY ][ yTbY ] : IntraPredModeC[ xTbY ][ yTbY ] | (1178) |
| nLfnstOutSize = ( nTbW >= 8 && nTbH >= 8 ) ? 48 : 16 | (1179) |
| log2LfnstSize = ( nTbW >= 8 && nTbH >= 8 ) ? 3 : 2 | (1180) |
| nLfnstSize = 1 << log2LfnstSize | (1181) |
| nonZeroSize = ( ( nTbW = = 4 && nTbH = = 4 ) \|\| ( nTbW = = 8 && nTbH = = 8 ) ) ? 8 : 16 | (1182) |

......
The variables nonZeroW and nonZeroH are derived as follows:
- If ApplyLfnstFlag[ cIdx ] is equal to 1 and nTbW is greater than or equal to 4 and nTbH is greater
  than or equal to 4, the following applies:

| | |
|---|---|
| nonZeroW = ( nTbW = = 4 \|\| nTbH = = 4 ) ? 4 : 8 | (1190) |
| nonZeroH = ( nTbW = = 4 \|\| nTbH = = 4 ) ? 4 : 8 | (1191) |

- Otherwise, the following applies:

| | |
|---|---|
| nonZeroW = Min( nTbW, ( trTypeHor > 0 ) ? 16 : 32 ) | (1192) |
| nonZeroH = Min( nTbH, ( trTypeVer > 0 ) ? 16 : 32 ) | (1193) |

......

As shown in Table 8, when setting the value of ApplyLfnstFlag[cIdx], since ApplyLfnstFlag[0] is a flag related only to the luma component, the value thereof may be set only when the coding unit is not coded in the chroma separate tree structure (i.e., when the coding unit is coded in the single tree structure or the luma separate tree structure). Since ApplyLfnstFlag[1] and ApplyLfnstFlag[2] are flags related only to the chroma component, the values thereof may be set only when the coding unit is not coded in the luma separate tree structure (i.e., when the coding unit is coded in the single tree structure or the chroma split tree structure).

Since only ApplyLfnstFlag[0] is referenced in the luma separate tree, only ApplyLfnstFlag[1] and ApplyLfnstFlag[2] are reference in the chroma separate tree, and ApplyLfnstFlag[0], ApplyLfnstFlag[1], and ApplyLfnstFlag[2] are referenced in the single tree, even though the value of ApplyLfnstFlag[cIdx] is set as shown in Table 8, the same operation as in Table 7 is performed.

In the current VVC standard, since the LFNST may be applied only to the luma component in the single tree, both ApplyLfnstFlag[1] and ApplyLfnstFlag[2] are set to 0 when the coding unit is coded in the single tree structure according to Table 8.

According to another embodiment, whether the LFNST is applied may be controlled according to the dual tree/single tree structure and a color component, and specification text shown in Table 9 may be applied instead of Table 7.

TABLE 9

7.4.11.5  Coding unit semantics
......
lfnst_idx specifies whether and which one of the two low frequency non-separable transform kernels in
a selected transform set is used. lfnst_idx equal to 0 specifies that the low frequency non-separable
transform is not used in the current coding unit.
When lfnst_idx is not present, it is inferred to be equal to 0.
The variable ApplyLfnstFlag[ cIdx ] is derived as follows for cIdx = 0..2:
- If treeType is equal to SINGLE_TREE, the following applies:
            ApplyLfnstFlag[ cIdx ] = ( lfnst_idx > 0 && cIdx = = 0 ) ? 1 : 0
            (177)
- Otherwise, the following applies:
            ApplyLfnstFlag[ cIdx ] = ( lfnst_idx > 0 ) ? 1 : 0                    (178)
......
8.7.3  Scaling process for transform coefficients
Inputs to this process are:
- a luma location ( xTbY, yTbY ) specifying the top-left sample of the current luma transform block
  relative to the top-left luma sample of the current picture,
- a variable nTbW specifying the transform block width,
- a variable nTbH specifying the transform block height,
- a variable predMode specifying the prediction mode of the coding unit,
- a variable cIdx specifying the colour component of the current block.
Output of this process is the (nTbW)x(nTbH) array d of scaled transform coefficients with elements
          d[ x ][ y ].
......
For the derivation of the scaled transform coefficients d[ x ][ y ] with x = 0..nTbW − 1, y = 0..nTbH − 1,
the following applies:
- The intermediate scaling factor m[ x ][ y ] is derived as follows:
    -   If one more of the following conditions are true,
        m[ x ][ y ] is set equal to 16:
            - sh_explicit_scaling_list_used_flag is equal to 0.
            - transform_skip_flag[ xTbY ][ yTbY ][ cIdx ] is equal to 1.
            - sps_scaling_matrix_for_lfnst_disabled_flag is equal to 1 and TABLE 9-continued

```
        ApplyLfnstFlag[ cIdx ] is
        equal to 1.
    -   sps_scaling_matrix_for_alternative_colour_space_disabled_flag
        is equal to 1 and
        sps_scaling_matrix_designated_colour_space_flag is equal to
        cu_act_enabled_flag[ xTbY ][ yTbY ].
    -   Otherwise, the following applies:
......
8.7.4  Transformation process for scaled transform coefficients
8.7.4.1  General
Inputs to this process are:
-  a luma location ( xTbY, yTbY ) specifying the top-left sampke of the current transform block
   relative to the top-left luma sample of the current picture,
-  a variable nTbW specifying the width of the current transform block,
-  a variable nTbH specifying the height of the current transform block,
-  a variable cIdx specifying the colour component of the current block,
-  an (nTbW)x(nTbH) array d[ x ][ y ] of scaled transform coefficients with x = 0..nTbW − 1,
   y = 0..nTbH − 1.
Output of this process is the (nTbW)x(nTbH) array res[ x ][ y ] of residual samples with
x = 0..nTbW − 1, y = 0..nTbH − 1.
When ApplyLfnstFlag[ cIdx ] is equal to 1, transform_skip_flag[ xTbY ][ yTbY ][ cIdx ] is equal to 0
and both nTbW and nTbH are greater than or equal to 4, the following applies:
-   The variables predModeIntra, nLfnstOutSize, log2LfnstSize, nLfnstSize, and nonZeroSize are
    derived as follows:
        predModeIntra                                                                =
        ( cIdx = = 0 ) ? IntraPredModeY[ xTbY ][ yTbY ] :                         (1178)
        IntraPredModeC[ xTbY ][ yTbY ]
        nLfnstOutSize = ( nTbW >= 8 && nTbH >= 8 ) ? 48 : 16                      (1179)
        log2LfnstSize = ( nTbW >= 8 && nTbH >= 8 ) ? 3 : 2                        (1180)
        nLfnstSize = 1 << log2LfnstSize                                           (1181)
        nonZeroSize = ( ( nTbW = = 4 && nTbH = = 4 )                               ||
        ( nTbW = = 8 && nTbH = = 8 ) ) ? 8 : 16                                   (1182)
......
The variables nonZeroW and nonZeroH are derived as follows:
-  If ApplyLfnstFlag[ cIdx ] is equal to 1 and nTbW is greater than or equal to
   4 and nTbH is greater than or equal to 4, the following applies:
   than or equal to 4, the following applies:
        nonZeroW = ( nTbW = = 4 || nTbH = = 4 ) ? 4 : 8                           (1190)
        nonZeroH = ( nTbW = = 4 || nTbH = = 4 ) ? 4 : 8                           (1191)
-   Otherwise, the following applies:
        nonZeroW = Min( nTbW, ( trTypeHor > 0 ) ? 16 : 32 )                       (1192)
        nonZeroH = Min( nTbH, ( trTypeVer > 0 ) ? 16 : 32 )                       (1193)
......
```

When compared, Table 9 and Table 7 are the same except for the definition of ApplyLfnstFlag[cIdx] (cIdx=0, 1, 2).

Referring to Table 9, the value of ApplyLfnstFlag[cIdx] (cIdx=0, 1, 2) is determined according to the tree structure in which the coding unit is coded and the cIdx value as follows.

1. Luma Separate Tree
ApplyLfnstFlag[0]=ApplyLfnstFlag[1]=ApplyLfnstFlag[2]=(lfnst_idx>0) ? 1:0
2. Chroma Separate Tree
ApplyLfnstFlag[0]=ApplyLfnstFlag[1]=ApplyLfnstFlag[2]=(lfnst_idx>0) ? 1:0
3. Single Tree
ApplyLfnstFlag[0]=(lfnst_idx>0) ? 1:0
ApplyLfnstFlag[1]=ApplyLfnstFlag[2]=0

The value of lfnst_idx (LFNST index) greater than 0 indicates that the LFNST is applied. As summarized above, in Table 9, in a separate tree structure, the same value is set for ApplyLfnstFlag[cIdx] regardless of color components. When the value of lfnst_idx is greater than 0, ApplyLfnstFlag[cIdx] is set to 1. Otherwise, ApplyLfnstFlag[cIdx] is set to 0.

In the luma separate tree, since no operation is performed on the chroma component (cIdx=1, 2), values set for ApplyLfnstFlag[1] and ApplyLfnstFlag[2] have no effect on the entire transformation process. Similarly, in the chroma separate tree, since no operation is performed on the luma component (cIdx=0), a value set for ApplyLfnstFlag[0] has no effect on the entire transformation process.

Referring to Table 7, the value of ApplyLfnstFlag[cIdx] (cIdx=0, 1, 2) is determined according to the tree structure in which the coding unit is coded and the cIdx value as follows.

1. Luma Separate Tree
ApplyLfnstFlag[0]=(lfnst_idx>0) ? 1:0
ApplyLfnstFlag[1]=ApplyLfnstFlag[2]=0
2. Chroma Separate Tree
ApplyLfnstFlag[0]=0
ApplyLfnstFlag[1]=ApplyLfnstFlag[2]=(lfnst_idx>0) ? 1:0
3. Single Tree
ApplyLfnstFlag[0]=(lfnst_idx>0) ? 1:0
ApplyLfnstFlag[1]=ApplyLfnstFlag[2]=0

As summarized above, in Table 7, the value of ApplyLfnstFlag[cIdx] is set to 0 for a color component irrelevant to a component to be coded.

Specifically, both ApplyLfnstFlag[1] and ApplyLfnstFlag[2] for the two chroma components are set to 0 in the luma separate tree, and ApplyLfnstFlag[0] for the luma component is set to 0 in the chroma separate tree. Since no image processing is applied to the color component irrelevant to the component to be coded, it may be conceptually proper to set ApplyLfnstFlag[cIdx] to 0.

According to an example, when an image with a 4:4:4 color format is coded in the single tree structure, it may be proposed to apply the LFNST.

A plurality of color formats is supported in the current standard, and a color format for a currently coded image may be specified by sps_chroma_format_idc and sps_separate_colour_plane_flag included in a sequence parameter set (SPS) syntax table shown in Table 10.

TABLE 10

| | Descriptor |
|---|---|
| seq_parameter_set_rbsp( ) { | |
| ...... | |
| sps_chroma_format_idc | u(2) |
| if( sps_chroma_format_idc = = 3 ) | |
| sps_separate_colour_plane_flag | u(1) |
| ...... | |
| } | |

Semantics of sps_chroma_format_idc and sps_separate_colour_plane_flag listed in Table 10 is specified as in Table 11, and a chroma format may be signaled based on at least one of sps_chroma_format_idc and sps_separate_colour_plane_flag as shown in Table 12.

TABLE 11

7.4.3.3 Sequence parameter set RBSP semantics
......
sps_chroma_format_idc specifies the chroma sampling relative to the luma sampling as specified in clause 6.2.
......
sps_separate_colour_plane_flag equal to 1 specifies that the three colour components of the 4:4:4 chroma format are coded separately. sps_separate_colour_plane_flag equal to 0 specifies that the colour components are not coded separately. When sps_separate_colour_plane_flag is not present, it is inferred to be equal to 0. When sps_separate_colour_plane_flag is equal to 1, the coded picture consists of three separate components, each of which consists of coded samples of one colour plane (Y, Cb, or Cr) and uses the monochrome coding syntax. In this case, each colour plane is associated with a specific sh_colour_plane_id value.
   NOTE 1 - There is no dependency in decoding processes between the colour planes having different sh_colour_plane_id values. For example, the decoding process of a monochrome picture with one value of sh_colour_plane_id does not use any data from monochrome pictures having different values of sh_colour_plane_id for inter prediction.
Depending on the value sps_separate_colour_plane_flag, the value of the variable ChromaArrayType is assigned as follows:
-   If sps_separate_colour_plane_flag is equal to 0, ChromaArrayType is set equal to sps_chroma_format_idc.
-   Otherwise (sps_separate_colour_plane_flag is equal to 1), ChromaArrayType is set equal to 0.
...

TABLE 12

| sps_chroma_format_idc | sps_separate_colour_plane_flag | Chroma format | SubWidthC | SubHeightC |
|---|---|---|---|---|
| 0 | 0 | Monochrome | 1 | 1 |
| 1 | 0 | 4:2:0 | 2 | 2 |
| 2 | 0 | 4:2:2 | 2 | 1 |
| 3 | 0 | 4:4:4 | 1 | 1 |
| 3 | 1 | 4:4:4 | 1 | 1 |

Figure 6:
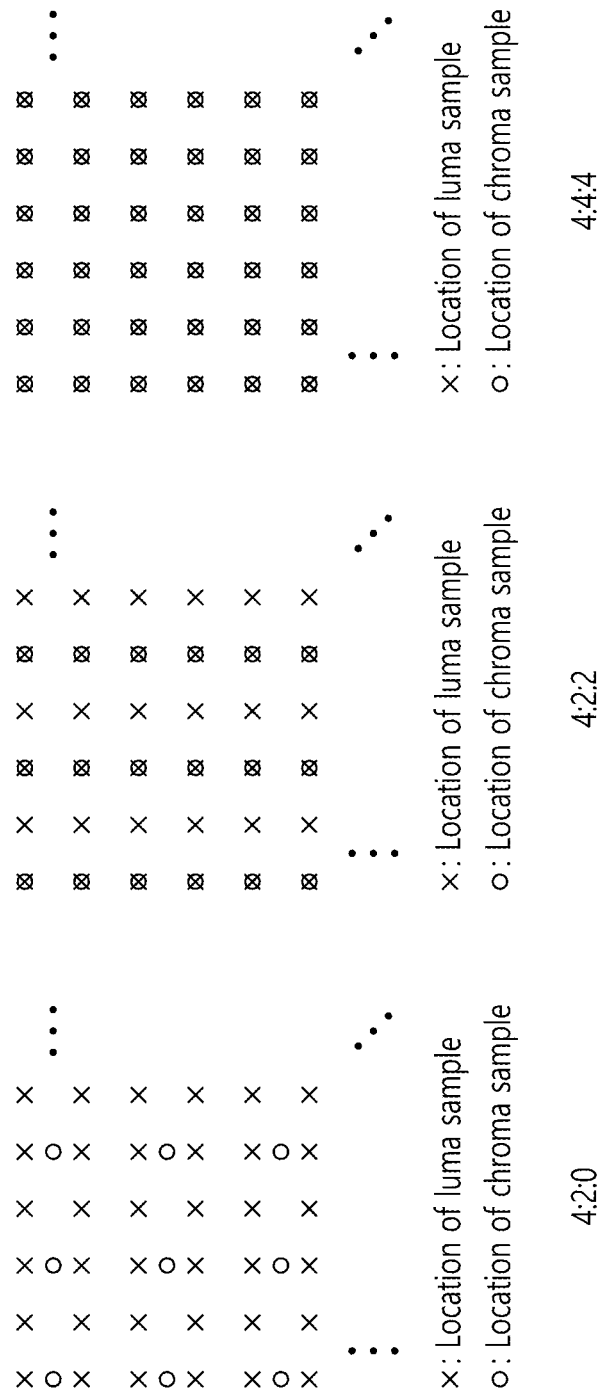
FIG. 6 illustrates a configuration of a sample according to a chroma format according to an embodiment of the present document.

FIG. 6 illustrates a configuration of a sample according to the color format of Table 12.

Sampling with a chroma format index of 1, that is, a color format of 4:2:0, indicates that the height and width of two chroma arrays are half the height and width of a luma array, respectively, and sampling with a chroma format index of 2, that is, a color format of 4:2:2, indicates that the height of two chroma arrays is equal to the height of a luma array and the width thereof is half the width of the luma array.

Sampling with a chroma format index of 3, that is, a color format of 4:4:4, indicates that the height and width of a chroma array are the same as the height and width of a luma array.

As shown in Table 11, a ChromaArrayType variable is set to the value of sps_chroma_format_idc when the value of sps_separate_colour_plane_flag is 0, and is set to 0 when the value of sps_separate_colour_plane_flag is 1.

In the current VVC standard, when one coding unit (CU) is coded in a single tree structure, an LFNST is configured to be applied only to a luma component. However, when a color format for the currently coded image is a 4:4:4 format (i.e., when the value of sps_chroma_format_idc is 3), even through the coding unit is coded in the single tree structure, the LFNST may be configured to be applied to chroma components.

Although the color format is described based on a luma component (Y) and chroma components (Cb and Cr) in Table 11, the above suggestion may be equally applied to color channels applied to other color systems, such as GBR or RGB. For example, in coding in the single tree structure, when a luma component is mapped to a green channel and chroma components are mapped to a blue channel and a red channel, an LFNST may be applied only to the green channel in the current VVC standard, while the LFNST may be configured to be applied to all of the green channel, the blue channel, and the red channel when a coding unit is coded in the single tree structure in a case where a color format for a currently coded image is 4:4:4.

Currently, one LFNST index is transmitted for each coding unit. Thus, when coding is performed in the single tree structure in a 4:4:4 color format, the same LFNST index may be applied to all color channels. Therefore, when an LFNST set to be applied is determined according to a predetermined criterion (e.g., an intra prediction mode or a transform block size) for each color channel, one of LFNST kernel candidates included in the LFNST set may be selected using one LFNST index.

In the current VVC standard, an LFNST is configured to be enabled only for the luma component in the single tree by resetting the ApplyLfnstFlag variable according to the color channel. Table 4 above shows how the ApplyLfnstFlag variable is set by the LFNST index value (lfnst_idx) in the current VVC specification text.

In Table 4, cIdx is an index indicating a color channel, and when a YUV color system is applied, a cIdx value of 0 indicates a luma component, and cIdx values of 1 and 2 indicate Cb and Cr components, respectively. In Table 4, when a current coding unit is coded in the single tree structure (when treeType is SINGLE_TREE), the value of the ApplyLfnstFlag variable can be 1 only when the value of cIdx is 0, and thus an LFNST may be applied only to a luma component (or a component indicated by a cIdx value of 0). Table 4 may be expressed as specification text of method (A) and method (B) as shown in Table 13.

TABLE 13

Method (A)
......
lfnst_idx specifies whether and which one of the two low frequency non-seperable transform kernels in a selected transform set is used. lfnst_idx equal to 0 specifies that the low frequency non-separable transform is not used in the current coding unit.
When lfnst_idx is not present, it is inferred to be equal to 0.
The variable ApplyLfnstFlag[ cIdx ] is derived as follows for cIdx = 0..2:
    ApplyLfnstFlag[ 0 ] = ( lfnst_idx > 0 && treeType != DUAL_TREE_CHROMA ) ? 1 : 0   (177)
    ApplyLfnstFlag[ 1 ] = ApplyLfnstFlag[ 2 ] =
        ( lfnst_idx > 0 && treeType = = DUAL_TREE_CHROMA ) ? 1 :
        0   (178)
......
Method (B)
......
lfnst_idx specifies whether and which one of the two low frequency non-seperable transform kernels in a selected transform set is used. lfnst_idx equal to 0 specifies that the low frequency non-separable transform is not used in the current coding unit.
When lfnst_idx is not present, it is inferred to be equal to 0.
The variable ApplyLfnstFlag[ cIdx ] is derived as follows for cIdx = 0..2:
-    If treeType is equal to SINGE_TREE, the following applies:
    ApplyLfnstFlag[ cIdx ] = ( lfnst_idx > 0 && cIdx = = 0 ) ? 1 : 0
    (177)
-    Otherwise, the following applies:
    ApplyLfnstFlag[ cIdx ] = ( lfnst_idx > 0 ) ? 1 : 0   (178)
......

When one coding unit in an image configured in a 4:4:4 color format is coded in the single tree structure and an LFNST is configured to be also applicable to chroma components, the specification texts in Table 4 and Table 13 may be changed as in Table 14. The three methods presented in Table 4 and Table 13 correspond to Method 1, Method 2, and Method 3 in Table 14, respectively.

TABLE 14

(Method 1)
......
lfnst_idx specifies whether and which one of the two low frequency non-separable transform kernels in a selected transform set is used. lfnst_idx equal to 0 specifies that the low frequency non-separable transform is not used in the current coding unit.
When lfnst_idx is not present, it is inferred to be equal to 0.
The variable ApplyLfnstFlag is derived as follows:
-    If treeType is equal to SINGLE_TREE and ChromaArrayType is not equal to 3, the following applies:
    ApplyLfnstFlag = ( lfnst_idx > 0 && cIdx = = 0 ) ? 1 : 0   (177)
-    Otherwise, the following applies:
    ApplyLfnstFlag = ( lfnst_idx > 0 ) ? 1 : 0   (178)
......
(Method 2)
......
lfnst_idx specifies whether and which one of the two low frequency non-separable transform kernels in a selected transform set is used. lfnst_idx equal to 0 specifies that the low frequency non-separable transform is not used in the current coding unit.
When lfnst_idx is not present, it is inferred to be equal to 0.
The variable ApplyLfnstFlag[ cIdx ] is derived as follows for cIdx = 0..2:
    ApplyLfnstFlag[ 0 ] = ( lfnst_idx > 0 && treeType != DUAL_TREE_CHROMA ) ? 1 : 0   (177)
    ApplyLfnstFlag[ 1 ] = ApplyLfnstFlag[ 2 ] =
        ( lfnst_idx > 0 && ( treeType = = DUAL_TREE_CHROMA | |
          ( treeType = = SINGLE_TREE &&
            ChromaArrayType = = 3 ) ) ) ? 1 : 0   (178)
......
(Method 3)
......

TABLE 14-continued lfnst_idx specifies whether and which one of the two low frequency non-separable transform kernels in a selected transform set is used. lfnst_idx equal to 0 specifies that the low frequency non-separable transform is not used in the current coding unit.
When lfnst_idx is not present, it is inferred to be equal to 0.
The variable ApplyLfnstFlag[ cIdx ] is derived as follows for cIdx = 0..2:
- If treeType is equal to SINGLE_TREE and ChromaArrayType is not equal to 3, the following applies:
    ApplyLfnstFlag[ cIdx ] = ( lfnst_idx > 0 && cIdx = = 0 ) ? 1 : 0
    (177)
- Otherwise, the following applies:
    ApplyLfnstFlag[ cIdx ] = ( lfnst_idx > 0 ) ? 1 : 0     (178)
......

In Table 14, ApplyLfnstFlag[cIdx] indicates whether an LFNST is applied to a component indicated by cIdx (cIdx may have a value of 0, 1, or 2). Specifically, when the value of ApplyLfnstFlag[cIdx] is 1, the LFNST is applicable to the component indicated by the cIdx value, and when the value of ApplyLfnstFlag[cIdx] is 0, the LFNST is not applicable to the component.

As described above, in a separate color plane mode (when the value of sps_separate_colour_plane_flag in Table 10 is 1), since the value of ChromaArrayType is 0, Table 14 operates in the same manner as the existing specification text (e.g., Table 4 or Table 13) even though the color format is 4:4:4.

In more detail, in the separate color plane mode, since the value of ChromaArrayType is 0, the value of ApplyLfnstFlag or AppyLfnstFlag[cIdx] is determined only based on whether the value of treeType (SINGLE_TREE, DUAL_TREE_LUMA, and DUAL_TREE_CHROMA as treeType indicate that coding is performed in a single tree structure, a luma separate tree structure, and a chroma separate tree structure, respectively) and the value of lfnst_idx are greater than 0 in Table 14.

Therefore, in the separate color plane mode, a desired operation is also performed through the specification text presented in Table 14. For reference, since each color component is independently coded in the separate color plane mode, an LFNST index is valid only for the color component, and the color component is designated by cIdx having a value of 0.

The following drawings are provided to describe specific examples of the present disclosure. Since specific designations of devices or designations of specific signals/messages/fields illustrated in the drawings are provided for illustration, technical features of the present disclosure are not limited to the specific designations used in the following drawings.

Figure 7:
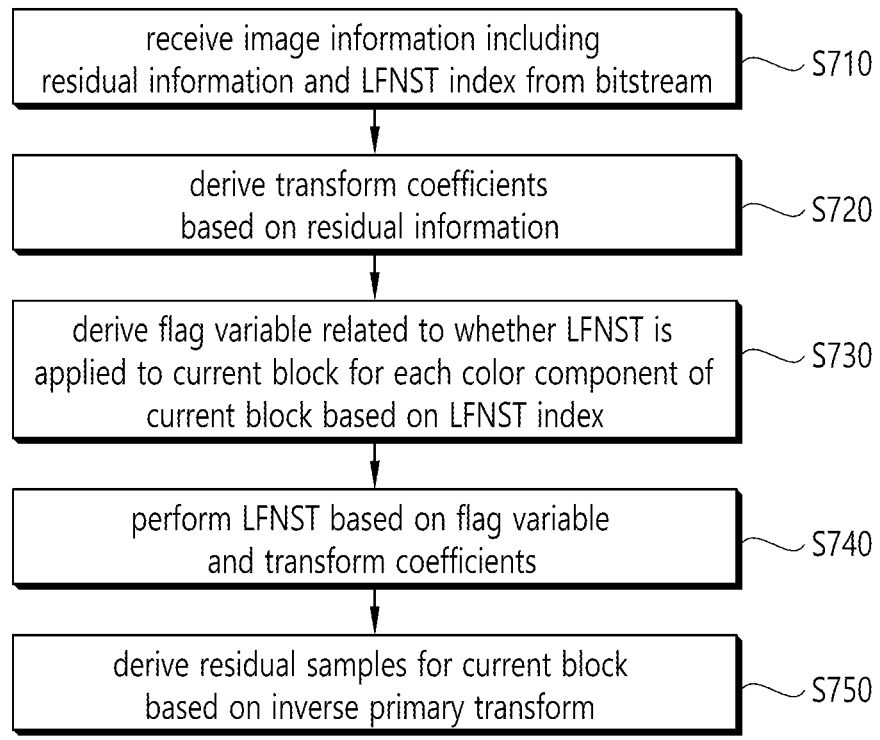
FIG. 7 is a flowchart illustrating an operation of a video decoding apparatus according to an embodiment of the present document.

FIG. 7 is a flowchart illustrating an operation of a video decoding apparatus according to an embodiment of the present document.

Each operation disclosed in FIG. 7 is based on some of the foregoing details explained with reference to FIG. 4 to FIG. 6. Therefore, a description of specific details overlapping with those explained above with reference to FIG. 3 and FIG. 6 will be omitted or will be made briefly.

The decoding apparatus 300 according to an embodiment may receive image information including residual information and an LFNST index (S710).

Specifically, the decoding apparatus 300 may decode information on quantized transform coefficients for a current block from the bitstream, and may derive quantized transform coefficients for a target block based on the information on the quantized transform coefficients for the current block. Information on the quantized transform coefficients for the target block may be included in a sequence parameter set (SPS) or a slice header, and may include at least one of information on whether an RST is applied, information on a reduced factor, information on a minimum transform size for applying an RST, information on a maximum transform size for applying an RST, an inverse RST size, and information on a transform index (LFNST index) indicating any one of transform kernel matrices included in a transform set.

The LFNST index may be signaled as syntax information in a coding unit level, and various conditions as in Table 3 need to be satisfied to signal the LFNST index.

The syntax information on the LFNST index may be received in a binarized bin string including 0 s and 1 s.

A syntax element of the LFNST index according to the present embodiment may indicate whether an inverse LFNST or an inverse non-separable transform is applied and any one of transform kernel matrices included in the transform set, and when the transform set includes two transform kernel matrices, the syntax element of the transform index may have three values.

That is, according to an embodiment, the values of the syntax element of the LFNST index may include 0 indicating that no inverse LFNST is applied to the target block, 1 indicating a first transform kernel matrix among the transform kernel matrices, and 2 indicating a second transform kernel matrix among the transform kernel matrices.

The decoding apparatus may further receive information on an intra prediction mode for the current block and information on whether an ISP is applied to the current block. The decoding apparatus may receive and parse flag information indicating whether to apply ISP coding or an ISP mode, thereby deriving whether the current block is split into a predetermined number of sub-partition transform blocks. Here, the current block may be a coding block. Further, the decoding apparatus may derive the size and number of split sub-partition blocks through flag information indicating a direction in which the current block is split.

The decoding apparatus 300 may derive transform coefficients by dequantizing the residual information on the current block, that is, quantized transform coefficients (S720).

The derived transform coefficients may be arranged in 4×4 block units according to a reverse diagonal scan order, and transform coefficients in a 4×4 block may also be arranged according to the reverse diagonal scan order. That is, the dequantized transform coefficients may be arranged according to a reverse scan order applied in a video codec, such as in VVC or HEVC.

The decoding apparatus may derive a residual sample for the current block from the transform coefficients based on an LFNST or MTS. The decoding apparatus may derive the residual sample based on an existing inverse primary transform rather than the MTS after applying the LFNST. Alternatively, the decoding apparatus may derive the residual sample based on the MTS or the existing inverse primary transform without applying the LFNST.

When the LFNST is applied to the current block, the decoding apparatus 300 may derive a flag variable related to whether the LFNST is applied to the current block for each color component of the current block based on the LFNST index (S730).

The flag variable ApplyLfnstFlag may be set after receiving the LFNST index, at which point a color index (cIdx) for a color component forming the current block cannot be referenced. Therefore, according to the present embodiment, the flag variable may be defined as a one-dimensional array (ApplyLfnstFlag[cIdx]) having a value corresponding to a color component. That is, a flag variable value may be derived separately for each color component for the current block. Here, the current block may be a coding unit.

According to an example, as shown in Table 7, when the coding unit is coded in a single tree structure or a luma separate tree structure (i.e., a condition "treeType != DUAL_TREE_CHROMA" in Table 7 is satisfied, where DUAL_TREE_CHROMA indicates a chroma separate tree), the ApplyLfnstFlag value may be 1 only for a luma component. That is, only the value of ApplyLfnstFlag[0] may be 1, and both ApplyLfnstFlag[1] and ApplyLfnstFlag[2] are 0.

When the coding unit is coded in a chroma separate tree structure (i.e., a condition "treeType==DUAL_TREE_CHROMA" in Table 7 is satisfied), the ApplyLfnstFlag value may be 1 only for a chroma component. That is, only the values of ApplyLfnstFlag[1] and ApplyLfnstFlag[2] may be 1, and ApplyLfnstFlag[0] is 0.

Alternatively, as shown in Table 8, since ApplyLfnstFlag[0] is a flag related only to the luma component, the value thereof may be set only when the coding unit is not coded in the chroma separate tree structure (i.e., when the coding unit is coded in the single tree structure or the luma separate tree structure). Since ApplyLfnstFlag[1] and ApplyLfnstFlag[2] are flags related only to the chroma component, the values thereof may be set only when the coding unit is not coded in the luma separate tree structure (i.e., when the coding unit is coded in the single tree structure or the chroma split tree structure).

That is, for a dual tree luma, only ApplyLfnstFlag[0] is set, and ApplyLfnstFlag[1] and ApplyLfnstFlag[2] are not set, and for a dual tree chroma, only ApplyLfnstFlag[1] and ApplyLfnstFlag[2] are set, and ApplyLfnstFlag[0]] is not set.

Since only ApplyLfnstFlag[0] is referenced in a case of a luma separate tree, only ApplyLfnstFlag[1] and ApplyLfnstFlag[2] are reference in a case of a chroma separate tree, and ApplyLfnstFlag[0], ApplyLfnstFlag[1], and ApplyLfnstFlag[2] are referenced in a case of a single tree, even though the value of ApplyLfnstFlag[cIdx] is set as shown in Table 8, the same operation as in Table 7 is performed.

Since the LFNST may be applied only to the luma component in the single tree, both ApplyLfnstFlag[1] and ApplyLfnstFlag[2] are set to 0 when the coding unit is coded in the single tree structure according to Table 8.

According to another method, as shown in Table 9, in a separate tree structure, the same value is set for ApplyLfnstFlag[cIdx] regardless of color components. When the value of lfnst_idx is greater than 0, ApplyLfnstFlag[cIdx] is set to 1. Otherwise, ApplyLfnstFlag[cIdx] is set to 0.

In the luma separate tree, since no operation is performed on the chroma component (cIdx=1, 2), values set for ApplyLfnstFlag[1] and ApplyLfnstFlag[2] have no effect on the entire transformation process. Similarly, in the chroma separate tree, since no operation is performed on the luma component (cIdx=0), a value set for ApplyLfnstFlag[0] has no effect on the entire transformation process.

In Table 9, in the single tree, ApplyLfnstFlag[0] is set to 1 when the value of lfnst_idx is greater than 0, and is set to 0 otherwise, and ApplyLfnstFlag[1] and ApplyLfnstFlag[2] are set to 0.

The decoding apparatus 300 may perform the LFNST on the current block based on the flag variable and the transform coefficients, thus deriving modified transform coefficients from the transform coefficients (S740).

The LFNST is a non-separable transform in which a transform is applied to coefficients without separating the coefficients in a specific direction, unlike a primary transform of vertically or horizontally separating coefficients to be transformed and transforming the same. This non-separable transform may be a low-frequency non-separable transform of applying forward transform only to a low-frequency region rather than the entire area of a block.

The decoding apparatus may determine an LFNST set including LFNST matrices based on the intra prediction mode derived from the information on the intra prediction mode, and may select any one of a plurality of LFNST matrices based on the LFNST set and the LFNST index.

Here, the same LFNST set and the same LFNST index may be applied to sub-partition transform blocks into which the current block is split. That is, since the same intra prediction mode is applied to the sub-partition transform blocks, the LFNST set determined based on the intra prediction mode may also be equally applied to all of the sub-partition transform blocks. In addition, since the LFNST index is signaled in the coding unit level, the same LFNST matrix may be applied to the sub-partition transform blocks into which the current block is split.

As described above, the transform set may be determined according to an intra prediction mode for a transform block to be transformed, and an inverse LFNST may be performed based on a transform kernel matrix, that is, any one of the LFNST matrices, included in the transform set indicated by the LFNST index. The matrix applied to the inverse LFNST may be called an inverse LFNST matrix or an LFNST matrix, and is referred to by any term as long as the matrix is the transpose of the matrix used for a forward LFNST.

In an example, the inverse LFNST matrix may be a non-square matrix in which the number of columns is less than the number of rows.

The decoding apparatus 300 may derive residual samples from the dequantized transform coefficients based on an inverse primary transform (S750).

Here, as the inverse primary transform, a conventional separable transform may be used, or the foregoing MTS may be used.

The following drawings are provided to describe specific examples of the present disclosure. Since specific designations of devices or designations of specific signals/messages/fields illustrated in the drawings are provided for illustration, technical features of the present disclosure are not limited to the specific designations used in the following drawings.

Figure 8:
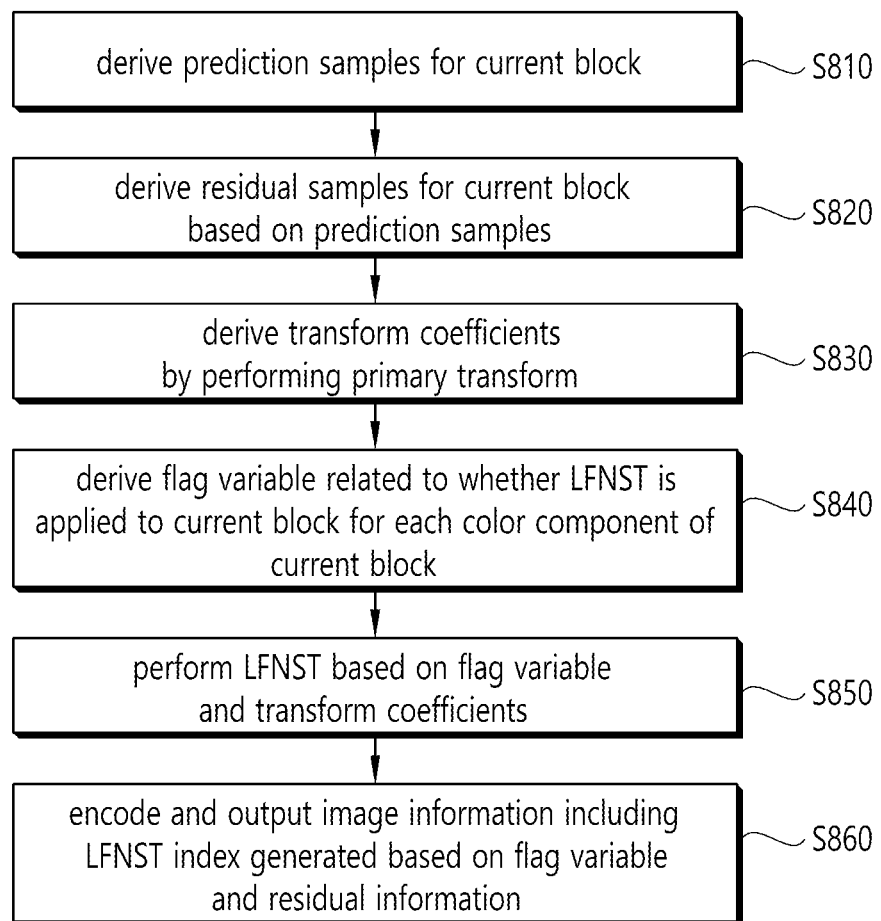
FIG. 8 is a flowchart illustrating an operation of a video encoding apparatus according to an embodiment of the present document.

FIG. 8 is a flowchart illustrating an operation of a video encoding apparatus according to an embodiment of the present document.

Each operation disclosed in FIG. 8 is based on some of the foregoing details explained with reference to FIG. 4 to FIG. 6. Therefore, a description of specific details overlapping with those explained above with reference to FIG. 2, FIG. 5A, FIG. 5B, and FIG. 6 will be omitted or will be made briefly.

The encoding apparatus 200 according to an embodiment may derive prediction samples for a current block based on an intra prediction mode applied to the current block (S810).

The encoding apparatus may derive residual samples for the current block based on the prediction samples (S820).

The encoding apparatus may derive transform coefficients by performing a primary transform (S830).

The primary transform may be performed through a plurality of transform kernels as in an MTS, in which case a transform kernel may be selected based on the intra prediction mode.

When the MTS is applied to the current block, the encoding apparatus may encode an MTS index related to an MTS matrix.

The encoding apparatus 200 may determine whether to perform a secondary transform or a non-separable transform, specifically the LFNST, on the transform coefficients for the current block and may derive modified transform coefficients by applying the LFNST to the transform coefficients.

The LFNST is a non-separable transform in which a transform is applied to coefficients without separating the coefficients in a specific direction, unlike a primary transform of vertically or horizontally separating coefficients to be transformed and transforming the same. This non-separable transform may be a low-frequency non-separable transform of applying transform only to a low-frequency region rather than the entire target block to be transformed.

The encoding apparatus 200 may derive a flag variable related to whether the LFNST is applied to the current block for each color component of the current block (S840).

The encoding apparatus may derive the flag variable ApplyLfnstFlag without referring to a color index (cIdx) for a color component forming the current block. According to the present embodiment, the flag variable may be defined as a one-dimensional array (ApplyLfnstFlag[cIdx]) having a value corresponding to a color component. That is, a flag variable value may be derived separately for each color component for the current block. Here, the current block may be a coding unit.

According to an example, as shown in Table 7, when the coding unit is coded in a single tree structure or a luma separate tree structure (i.e., a condition "treeType != DUAL_TREE_CHROMA" in Table 7 is satisfied, where DUAL_TREE_CHROMA indicates a chroma separate tree), the ApplyLfnstFlag value may be 1 only for a luma component. That is, only the value of ApplyLfnstFlag[0] may be 1, and both ApplyLfnstFlag[1] and ApplyLfnstFlag[2] are 0.

When the coding unit is coded in a chroma separate tree structure (i.e., a condition "treeType==DUAL_TREE_CHROMA" in Table 7 is satisfied), the ApplyLfnstFlag value may be 1 only for a chroma component. That is, only the values of ApplyLfnstFlag[1] and ApplyLfnstFlag[2] may be 1, and ApplyLfnstFlag[0] is 0.

Alternatively, as shown in Table 8, since ApplyLfnstFlag[0] is a flag related only to the luma component, the value thereof may be set only when the coding unit is not coded in the chroma separate tree structure (i.e., when the coding unit is coded in the single tree structure or the luma separate tree structure). Since ApplyLfnstFlag[1] and ApplyLfnstFlag[2] are flags related only to the chroma component, the values thereof may be set only when the coding unit is not coded in the luma separate tree structure (i.e., when the coding unit is coded in the single tree structure or the chroma split tree structure).

That is, for a dual tree luma, only ApplyLfnstFlag[0] is set, and ApplyLfnstFlag[1] and ApplyLfnstFlag[2] are not set, and for a dual tree chroma, only ApplyLfnstFlag[1] and ApplyLfnstFlag[2] are set, and ApplyLfnstFlag[0]] is not set.

Since only ApplyLfnstFlag[0] is referenced in a case of a luma separate tree, only ApplyLfnstFlag[1] and ApplyLfnstFlag[2] are reference in a case of a chroma separate tree, and ApplyLfnstFlag[0], ApplyLfnstFlag[1], and ApplyLfnstFlag[2] are referenced in a case of a single tree, even though the value of ApplyLfnstFlag[cIdx] is set as shown in Table 8, the same operation as in Table 7 is performed.

Since the LFNST may be applied only to the luma component in the single tree, both ApplyLfnstFlag[1] and ApplyLfnstFlag[2] are set to 0 when the coding unit is coded in the single tree structure according to Table 8.

According to another method, as shown in Table 9, in a separate tree structure, the same value is set for ApplyLfnstFlag[cIdx] regardless of color components. When the value of lfnst_idx is greater than 0, ApplyLfnstFlag[cIdx] is set to 1. Otherwise, ApplyLfnstFlag[cIdx] is set to 0.

In the luma separate tree, since no operation is performed on the chroma component (cIdx=1, 2), values set for ApplyLfnstFlag[1] and ApplyLfnstFlag[2] have no effect on the entire transformation process. Similarly, in the chroma separate tree, since no operation is performed on the luma component (cIdx=0), a value set for ApplyLfnstFlag[0] has no effect on the entire transformation process.

In Table 9, in the single tree, ApplyLfnstFlag[0] is set to 1 when the value of lfnst_idx is greater than 0, and is set to 0 otherwise, and ApplyLfnstFlag[1] and ApplyLfnstFlag[2] are set to 0.

The encoding apparatus 200 may perform the LFNST based on the flag variable and the transform coefficients (S850).

The encoding apparatus may compare RD values of only LFNST matrices having a LfnstDcOnly value of 0 and a LfnstZeroOutSigCoeffFlag variable of 1 by applying a plurality of LFNST candidates, that is, LFNST matrices.

The encoding apparatus may select an optimal LFNST matrix, and may derive modified transform coefficients based on the selected LFNST.

A transform set may be determined according to an intra prediction mode for a transform block to be transformed, and the matrix applied to the LFNST is the transpose of a matrix used for an inverse LFNST.

In an example, the LFNST matrix may be a non-square matrix in which the number of rows is less than the number of columns.

The encoding apparatus may encode and output image information including an LFNST index generated based on the flag variable and residual information (S860).

The encoding apparatus may derive quantized transform coefficients by performing quantization based on the modified transform coefficients for the current block, and may encode and output the image information including the LFNST index.

The encoding apparatus may generate residual information including information on the quantized transform coefficients. The residual information may include information/syntax elements related to the foregoing transformation. The encoding apparatus may encode image/video information including the residual information and may output the encoded image/video information in the form of a bitstream.

Specifically, the encoding apparatus 200 may generate the information on the quantized transform coefficients and may encode the quantized information on the generated transform coefficients.

In the present disclosure, at least one of quantization/dequantization and/or transform/inverse transform may be omitted. When quantization/dequantization is omitted, a quantized transform coefficient may be referred to as a transform coefficient. When transform/inverse transform is omitted, the transform coefficient may be referred to as a coefficient or a residual coefficient, or may still be referred to as a transform coefficient for consistency of expression.

Further, in the present disclosure, a quantized transform coefficient and a transform coefficient may be referred to as a transform coefficient and a scaled transform coefficient, respectively. In this case, residual information may include information on a transform coefficient(s), and the information on the transform coefficient(s) may be signaled through a residual coding syntax. Transform coefficients may be derived based on the residual information (or information on the transform coefficient(s)), and scaled transform coefficients may be derived through inverse transform (scaling) of the transform coefficients. Residual samples may be derived based on the inverse transform (transform) of the scaled transform coefficients. These details may also be applied/expressed in other parts of the present disclosure.

In the above-described embodiments, the methods are explained on the basis of flowcharts by means of a series of steps or blocks, but the present disclosure is not limited to the order of steps, and a certain step may be performed in order or step different from that described above, or concurrently with another step. Further, it may be understood by a person having ordinary skill in the art that the steps shown in a flowchart are not exclusive, and that another step may be incorporated or one or more steps of the flowchart may be removed without affecting the scope of the present disclosure.

The above-described methods according to the present disclosure may be implemented as a software form, and an encoding apparatus and/or decoding apparatus according to the disclosure may be included in a device for image processing, such as, a TV, a computer, a smartphone, a set-top box, a display device or the like.

When embodiments in the present disclosure are embodied by software, the above-described methods may be embodied as modules (processes, functions or the like) to perform the above-described functions. The modules may be stored in a memory and may be executed by a processor. The memory may be inside or outside the processor and may be connected to the processor in various well-known manners. The processor may include an application-specific integrated circuit (ASIC), other chipset, logic circuit, and/or a data processing device. The memory may include a read-only memory (ROM), a random access memory (RAM), a flash memory, a memory card, a storage medium, and/or other storage device. That is, embodiments described in the present disclosure may be embodied and performed on a processor, a microprocessor, a controller or a chip. For example, function units shown in each drawing may be embodied and performed on a computer, a processor, a microprocessor, a controller or a chip.

Further, the decoding apparatus and the encoding apparatus to which the present disclosure is applied, may be included in a multimedia broadcasting transceiver, a mobile communication terminal, a home cinema video device, a digital cinema video device, a surveillance camera, a video chat device, a real time communication device such as video communication, a mobile streaming device, a storage medium, a camcorder, a video on demand (VoD) service providing device, an over the top (OTT) video device, an Internet streaming service providing device, a three-dimensional (3D) video device, a video telephony video device, and a medical video device, and may be used to process a video signal or a data signal. For example, the over the top (OTT) video device may include a game console, a Blu-ray player, an Internet access TV, a Home theater system, a smartphone, a Tablet PC, a digital video recorder (DVR) and the like.

In addition, the processing method to which the present disclosure is applied, may be produced in the form of a program executed by a computer, and be stored in a computer-readable recording medium. Multimedia data having a data structure according to the present disclosure may also be stored in a computer-readable recording medium. The computer-readable recording medium includes all kinds of storage devices and distributed storage devices in which computer-readable data are stored. The computer-readable recording medium may include, for example, a Blu-ray Disc (BD), a universal serial bus (USB), a ROM, a PROM, an EPROM, an EEPROM, a RAM, a CD-ROM, a magnetic tape, a floppy disk, and an optical data storage device. Further, the computer-readable recording medium includes media embodied in the form of a carrier wave (for example, transmission over the Internet). In addition, a bitstream generated by the encoding method may be stored in a computer-readable recording medium or transmitted through a wired or wireless communication network. Additionally, the embodiments of the present disclosure may be embodied as a computer program product by program codes, and the program codes may be executed on a computer by the embodiments of the present disclosure. The program codes may be stored on a computer-readable carrier.

Claims disclosed herein can be combined in a various way. For example, technical features of method claims of the present disclosure can be combined to be implemented or performed in an apparatus, and technical features of apparatus claims can be combined to be implemented or performed in a method. Further, technical features of method claims and apparatus claims can be combined to be implemented or performed in an apparatus, and technical features of method claims and apparatus claims can be combined to be implemented or performed in a method.

Figure 9:
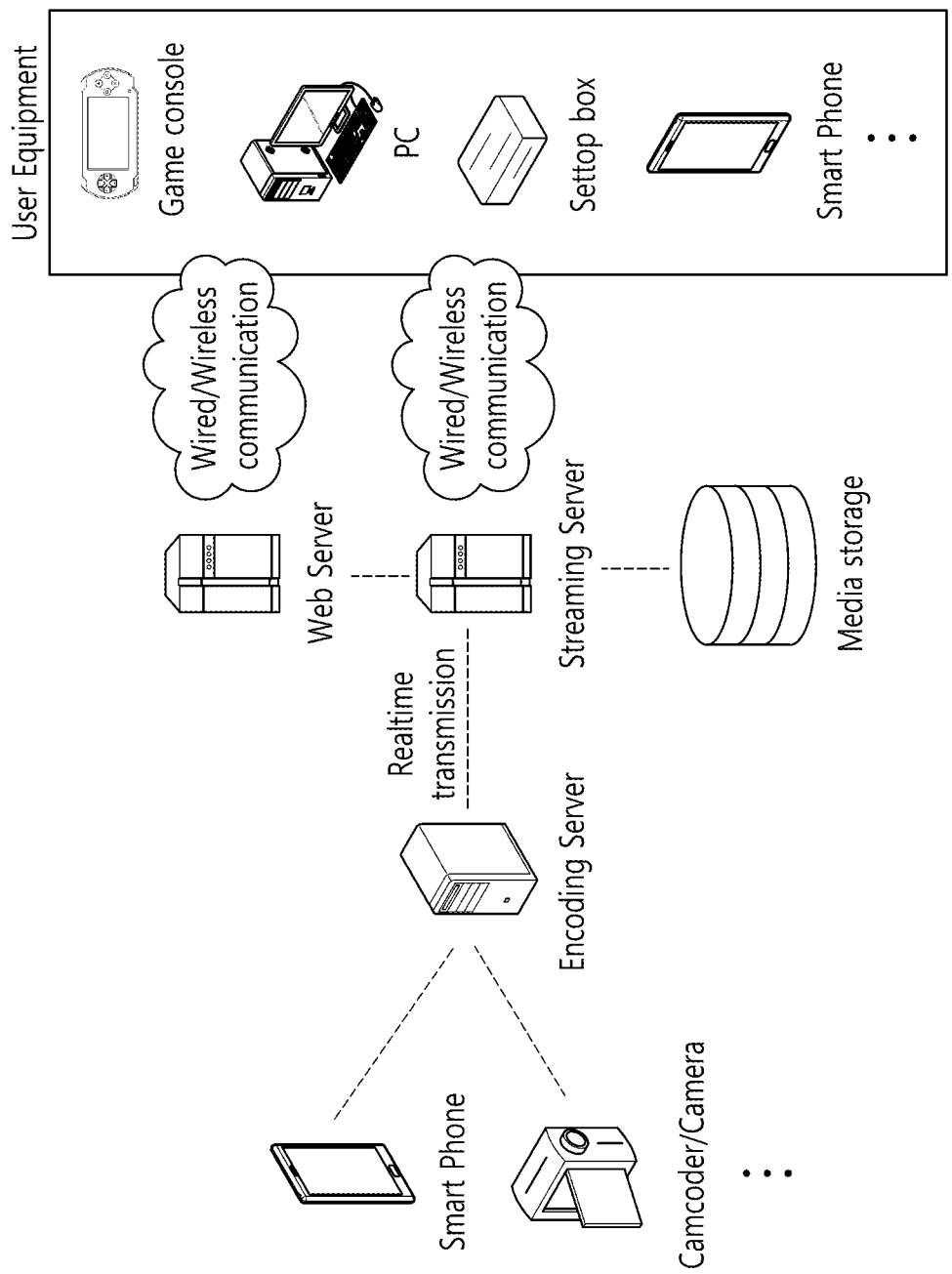
FIG. 9 illustrates a structure of a content streaming system to which the present document is applied.

FIG. 9 illustrates the structure of a content streaming system to which the present disclosure is applied.

Further, the contents streaming system to which the present disclosure is applied may largely include an encoding server, a streaming server, a web server, a media storage, a user equipment, and a multimedia input device.

The encoding server functions to compress to digital data the contents input from the multimedia input devices, such as the smart phone, the camera, the camcorder and the like, to generate a bitstream, and to transmit it to the streaming server. As another example, in a case where the multimedia input device, such as, the smart phone, the camera, the camcorder or the like, directly generates a bitstream, the encoding server may be omitted. The bitstream may be generated by an encoding method or a bitstream generation method to which the present disclosure is applied. And the streaming server may store the bitstream temporarily during a process to transmit or receive the bitstream.

The streaming server transmits multimedia data to the user equipment on the basis of a user's request through the web server, which functions as an instrument that informs a user of what service there is. When the user requests a service which the user wants, the web server transfers the request to the streaming server, and the streaming server transmits multimedia data to the user. In this regard, the contents streaming system may include a separate control server, and in this case, the control server functions to control commands/responses between respective equipments in the content streaming system.

The streaming server may receive contents from the media storage and/or the encoding server. For example, in a case the contents are received from the encoding server, the contents may be received in real time. In this case, the streaming server may store the bitstream for a predetermined period of time to provide the streaming service smoothly.

For example, the user equipment may include a mobile phone, a smart phone, a laptop computer, a digital broadcasting terminal, a personal digital assistant (PDA), a portable multimedia player (PMP), a navigation, a slate PC, a tablet PC, an ultrabook, a wearable device (e.g., a watch-type terminal (smart watch), a glass-type terminal (smart glass), a head mounted display (HMD)), a digital TV, a desktop computer, a digital signage or the like. Each of servers in the contents streaming system may be operated as a distributed server, and in this case, data received by each server may be processed in distributed manner.

What is claimed is:

1. An image decoding method performed by a decoding apparatus, the method comprising:
   receiving image information comprising residual information and an LFNST index from a bitstream;
   deriving transform coefficients by performing dequantization based on the residual information;
   deriving a flag variable array related to whether an LFNST is applied to a current block based on the LFNST index; and
   performing the LFNST based on the flag variable array and the transform coefficients,
   wherein the flag variable array is defined as a one-dimensional array,
   wherein flag variables included in the flag variable array are derived for each color component of the current block,
   wherein the flag variable array includes a first flag variable for a luma component, a second flag variable for a Cb component and a third flag variable for a Cr component,
   wherein the first flag variable is set to 1 and the second flag variable and the third flag variable are set to 0, based on a tree type of the current block being a single tree and a value of the LFNST index being greater than 0,
   wherein the first flag variable is set to 1 based on a tree type of the current block being a dual tree luma and the value of the LFNST index being greater than 0,
   wherein the second flag variable and the third flag variable are set to 1 based on a tree type of the current block being a dual tree chroma and a value of the LFNST index being greater than 0,
   wherein the dequantization is performed based on a scaling list, and
   wherein whether to apply the scaling list for the each color component of the current block is determined based on a value of a flag variable allocated for the each color component in the flag variable array.

2. The image decoding method of claim 1, wherein the LFNST is performed on a chroma component of the current block based on a tree type of the current block being a single tree and a color format of the current block being 4:4:4.

3. An image encoding method performed by an encoding apparatus, the method comprising:
   deriving prediction samples for a current block;
   deriving residual samples for the current block based on the prediction samples;
   deriving transform coefficients by performing a primary transform on the residual samples;
   deriving a flag variable array related to whether an LFNST is applied to the current block;
   performing the LFNST based on the flag variable array and the transform coefficients;
   performing quantization on the transform coefficients; and
   encoding and outputting image information comprising an LFNST index generated based on the flag variable array and the quantized transform coefficients,
   wherein the flag variable array is defined as a one-dimensional array,
   wherein flag variables included in the flag variable array are derived for each color component of the current block, and
   wherein the flag variable array is derived for each color component of the current block,
   wherein the flag variable array includes a first flag variable for a luma component, a second flag variable for a Cb component and a third flag variable for a Cr component,
   wherein the first flag variable is set to 1 and the second flag variable and the third flag variable are set to 0, based on a tree type of the current block being a single tree and a value of the LFNST index being greater than 0,
   wherein the first flag variable is set to 1 based on a tree type of the current block being a dual tree luma and the value of the LFNST index being greater than 0,
   wherein the second flag variable and the third flag variable are set to 1 based on a tree type of the current block being a dual tree chroma and a value of the LFNST index being greater than 0,
   wherein the quantization is performed based on a scaling list, and
   wherein whether to apply the scaling list for the each color component of the current block is determined based on a value of a flag variable allocated for the each color component in the flag variable array.

4. The image decoding method of claim 3, wherein the LFNST is performed on a chroma component of the current block based on a tree type of the current block being a single tree and a color format of the current block being 4:4:4.

5. A non-transitory computer-readable digital storage medium for storing a bitstream generated by the image encoding method of claim 3.

6. A method for transmitting data for image information comprising:
   deriving prediction samples for a current block;
   deriving residual samples for the current block based on the prediction samples;
   deriving transform coefficients by performing a primary transform on the residual samples;
   deriving a flag variable array related to whether an LFNST is applied to the current block;
   performing the LFNST based on the flag variable array and the transform coefficients;
   performing quantization on the transform coefficients; and encoding and outputting the image information comprising an LFNST index generated based on the flag variable array and the quantized transform coefficients, wherein the flag variable array is defined as a one-dimensional array, wherein flag variables included in the flag variable array are derived for each color component of the current block, wherein the flag variable array includes a first flag variable for a luma component, a second flag variable for a Cb component and a third flag variable for a Cr component, wherein the first flag variable is set to 1 and the second flag variable and the third flag variable are set to 0, based on a tree type of the current block being a single tree and a value of the LFNST index being greater than 0, wherein the first flag variable is set to 1 based on a tree type of the current block being a dual tree luma and the value of the LFNST index being greater than 0, wherein the second flag variable and the third flag variable are set to 1 based on a tree type of the current block being a dual tree chroma and a value of the LFNST index being greater than 0, wherein the quantization is performed based on a scaling list, and wherein whether to apply the scaling list for the each color component of the current block is determined based on a value of a flag variable allocated for the each color component in the flag variable array.

* * * * *